United States Patent
Angeletti et al.

(10) Patent No.: US 9,356,685 B2
(45) Date of Patent: May 31, 2016

(54) MULTIBEAM SATELLITE COMMUNICATION SYSTEM AND METHOD, AND SATELLITE PAYLOAD FOR CARRYING OUT SUCH A METHOD

(75) Inventors: Piero Angeletti, Ah Lisse (NL); Riccardo De Gaudenzi, GI den Hague (NL); Emiliano Re, Leiden (NL); Nicolas Jeannin, Toulouse (FR); Alfredo Vernucci, Rome (IT)

(73) Assignee: Agence Spatiale Europeenne, Paris (FR)

( * ) Notice: Subject to any disclaimer, the term of this patent is extended or adjusted under 35 U.S.C. 154(b) by 0 days.

(21) Appl. No.: 14/410,749

(22) PCT Filed: Jun. 29, 2012

(86) PCT No.: PCT/IB2012/001742
§ 371 (c)(1),
(2), (4) Date: Dec. 23, 2014

(87) PCT Pub. No.: WO2014/001837
PCT Pub. Date: Jan. 3, 2014

(65) Prior Publication Data
US 2015/0188623 A1    Jul. 2, 2015

(51) Int. Cl.
*H04B 7/00* (2006.01)
*H04B 7/185* (2006.01)
*H04B 7/204* (2006.01)

(52) U.S. Cl.
CPC .......... *H04B 7/18515* (2013.01); *H04B 7/2041* (2013.01)

(58) Field of Classification Search
CPC ........................ H04B 7/18515; H04B 7/18518
USPC .............. 455/427, 3.02, 428, 12.1, 13.2, 13.3
See application file for complete search history.

(56) References Cited

U.S. PATENT DOCUMENTS 5,966,371 A * 10/1999 Sherman ............ H04B 7/18513
370/320
6,317,420 B1 * 11/2001 Schiff ................ H04B 7/18539
370/325

(Continued)

OTHER PUBLICATIONS

Bosisio A., et al.; "Analysis and Applications of Short-Distance Site Diversity Techniqies for 20/30 GHz Communication Links"; *Proceedings of the Globecom '95; IEEE 1995 Global Telecommunications Conference*, Singapore, 1995, Nov. 13, 1995; pp. 749-753; XP010607654.

Luglio, M., et al.; "Large-Scale Site Diversity for Satellite Communication Networks"; *Int. J. Satell. Commun.* 2002; No. 20, pp. 251-260; XP002691616.

(Continued)

*Primary Examiner* — John J Lee
(74) *Attorney, Agent, or Firm* — Alston & Bird LLP

(57) ABSTRACT

A satellite communication system including a multibeam satellite for generating a plurality of feeder beams and a plurality of user beams over a region of interest, a plurality of spatially-separated gateway stations for providing feeder links to said multibeam satellite via respective feeder beams; and a control for operating said gateway stations and multibeam satellite such that: in nominal conditions, $N_{GW}$ gateway stations exchange data with K user beams, each of the gateway stations allocating a fraction of its bandwidth to each of the user beams; and in case of fading, data are switched from faded to unfaded gateway stations, whereby none of said user terminals experiences service outage. A method of performing satellite communication using the satellite communication system, and a multibeam communication satellite payload for carrying out the method are provided.

21 Claims, 30 Drawing Sheets

(56) References Cited

U.S. PATENT DOCUMENTS

| | | | |
|---|---|---|---|
| 6,751,458 B1* | 6/2004 | Wang | H04B 7/18539 |
| | | | 455/12.1 |
| 7,584,297 B1 | 9/2009 | Wilcoxson | |
| 7,599,657 B2 | 10/2009 | Schiff | |
| 2004/0066347 A1* | 4/2004 | Schiff | H04B 7/18534 |
| | | | 343/776 |
| 2008/0146145 A1* | 6/2008 | Pateros | H04B 7/1858 |
| | | | 455/12.1 |

OTHER PUBLICATIONS

Thompson, P. et al.; "Concepts and Technologies for a Terabit/s Satellite"; *Spacomm 2011, The Third International Conference on Advances in Satellite and Space Communications*; Apr. 18, 2011; pp. 12-19; XP002691614.

International Search Report and Written Opinion from International Application No. PCT/IB2012/001742 dated Feb. 18, 2013.

* cited by examiner

Feeder Link
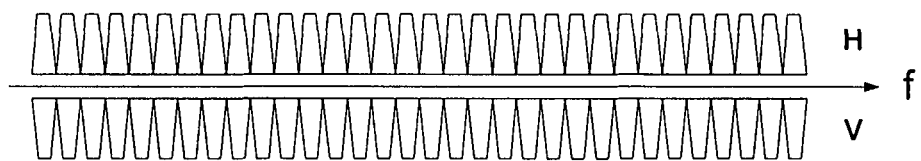
User Link
B1 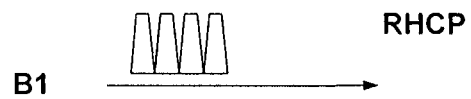 RHCP
B2 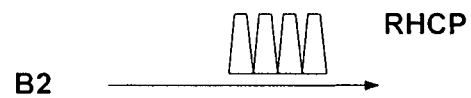 RHCP
B3 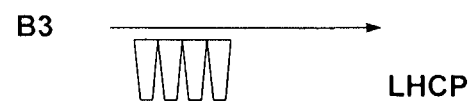 LHCP
B4 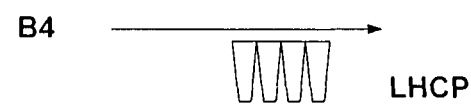 LHCP
FIG 6

MULTIBEAM SATELLITE COMMUNICATION SYSTEM AND METHOD, AND SATELLITE PAYLOAD FOR CARRYING OUT SUCH A METHOD

FIELD

The invention relates to a satellite communication system, a method of performing satellite communication and a multibeam communication satellite payload for carrying out such a method.

BACKGROUND

More precisely, the invention relates to the technical field of high-capacity broadband multibeam satellite networks. As illustrated on FIG. 1A, a multibeam satellite network comprises a plurality of gateway stations (or simply "gateways") $GW_1$, $GW_2$ ... $GW_N$, which are usually connected to a terrestrial telecommunication network TN (e.g. the Internet). Bi-directional (or sometimes one-directional) communication is established between said gateway stations and user terminals $UT_1$, $UT_2$, ... $UT_M$, distributed over a region of interest ROI, through a geostationary multibeam satellite SAT. Said satellite generates two sort of beams: feeder beams $FB_1$ ... $FB_N$, which are associated to respective gateway stations, and user beams $UB_1$ ... $UB_K$, which are associated to user terminals; usually, several user terminals are located within the footprint of a single user beam and share its resources using Time and/or Frequency Division Multiple Access, while there is normally a single gateway section per feeder beam.

Some vocabulary has to be introduced at this point:
- each (usually bidirectional) connection between a gateway station GW and the satellite SAT is called a feeder link FL;
- each (usually bidirectional) connection between the satellite SAT and a user terminal UT is called a user link UL;
- a ground-to-satellite connection is called an uplink upL, and a satellite-to-ground connection is called a downlink dwL;
- a one-directional gateway station—user terminal connection is called a forward link fwL; it comprises a uplink section belonging to a feeder link and a downlink section belonging to a user link;
- a one-directional user terminal—gateway station connection is called a return link rtL; it comprises an uplink section belonging to a user link and a downlink section belonging to a feeder link.

This is illustrated on FIG. 1B.

In known systems, each gateway station serves a plurality of user beams, but each user beam is served by a single gateway station. Therefore, feeder links need a much larger throughput than user beams.

As the available feeder link bandwidth is limited, it is common practice to fully reuse the frequency placing the gateway stations far enough from each other to ensure spatial isolation from the satellite multi-beam antenna. Typically the feeder link is using a dedicated frequency band separated from the user link one; in certain cases both the feeder link and the user link frequency bands can be reused by means of antenna beams spatial separation. On the contrary, as user terminals are scattered over all the region of interest, adjacent user beams use different frequencies and/or polarizations; indeed, as the user links bandwidth is constrained (e.g. due to regulatory aspects), the capacity of the system can only be boosted increasing the frequency reuse factor thanks to the partitioning of the coverage region among the largest number of beams compatible with space segment capability.

The wanted increase in the number of user beams may find limitations in the feeder links available throughput. This is because the required throughput increases linearly with the number of user links. More precisely, assuming a regular frequency reuse pattern for the user links (UL) characterized by $N_C^{UL}$ colours (obtained by means of frequency or polarization reuse) over $N_B^{UL}$ user beams with a total user link bandwidth allocation $B^{UL}$, then the required aggregate feeder link bandwidth is given by:

$$B_{Tot}^{FL} = N_B^{UL} \frac{B^{UL} N_P^{UL}}{N_C^{UL}} = N_B^{UL} B_B^{UL} \tag{1}$$

where $B_B^{UL}$ is the bandwidth per beam and $N_P^{UL}$ indicates the number of polarizations exploited in the user link frequency/polarization reuse scheme. It is worth mentioning here that in most of current multibeam systems, the total available band in the user link $B^{UL}$ is segmented in different parts commonly named colours in the polarization and/or frequency domain. A typical arrangement of a frequency plan is shown in the upper part of FIG. 6. As mentioned above, segmentation of the available band is necessary to isolate adjacent beams, which otherwise would interfere with each other jeopardizing the proper operation of the system. As a consequence, the user link band per beam is given by $$B_B^{UL} = B^{UL} \cdot \frac{N_P^{UL}}{N_C^{UL}}.$$

The minimum number of required gateways $N_{GW}^{Req}$ is then given by:

$$N_{GW}^{Req} = \left\lceil \frac{B_{Tot}^{FL}}{B_{G.W.}^{FL}} \right\rceil = \left\lceil N_B^{UL} \cdot \frac{\frac{B^{UL} N_P^{UL}}{N_C^{UL}}}{\frac{B^{FL} N_P^{FL}}{N_C^{FL}}} \right\rceil \tag{2}$$

where ⌈ ⌉ represents the largest integer operator, $B_{GW}^{FL}$ is the available feeder link bandwidth per gateway (including, if applicable the use of double polarization), $B^{FL}$ is the frequency bandwidth allocated to the feeder link, $N_P^{FL}$ indicates the number of polarizations in the feeder link frequency/polarization reuse scheme and $N_C^{FL}$ is the number of "colours" in the regular frequency reuse pattern of the feeder link. Note that it is common that double polarization is used for the feeder links ($N_P^{FL}=2$) and that all gateways share the same frequency thanks to the satellite gateway beams good spatial isolation ($N_C^{FL}=1$).

Most communication systems of the kind depicted on FIG. 1A operate in the Ka-band, using part of this band for the feeder links and another part of it for the user links. To further increase the capacity, it has been proposed to allocate the whole Ka-band to the user links, moving the feeder links to higher frequencies, e.g. the Q/V band (40-50 GHz).

For example, a state-of-the-art Ka-band system may have $N_B^{UL}=100$ user beams using part of the protected Ka-band (i.e. $B^{UL}=0.5$ GHz) and a Ka-band feeder link band with $B^{FL}=1$ GHz, 4 colours scheme with polarization reuse in the user links ($N_C^{UL}=4$, $N_P^{UL}=2$) and full frequency reuse with double polarization in the feeder link ($N_C^{UL}=1$, $N_P^{UL}=2$); then, according to equation (2), the required number of gateway stations is $N_{GW}^{Req} \geq 13$.

In case of a more aggressive scenario with Ka-band user link and Q/V-band feeder link with $N_B^{UL}=100$ beam system using the shared portion of the Ka-band (i.e. $B^{UL}=2.9$ GHz) and a Q/V-band feeder link band with $B^{FL}=4.5$ GHz, 4 colours scheme with polarization reuse in the user link $N_C^{UL}=4$, $N_P^{UL}=2$) and full frequency reuse with double polarization in the feeder link ($N_C^{FL}=1$, $N_P^{FL}=2$), equation (2) gives $N_{GW}^{Req} \geq 17$.

The satellite feeder links are key elements of the satellite system availability budget as each gateway station typically serves a certain number of user beams, each supporting several users. Therefore, outage of a single gateway station, e.g. due to rain attenuation, may cause a complete service interruption for a large number of users, which is not acceptable. As a consequence, the feeder links have to be designed to provide a very high link availability, typically in the order of 99.9% or higher. This design approach ensures that, for a given system availability target, the atmospheric fading is mainly affecting the satellite user link. In the feeder forward link, a typical Fade Mitigation Techniques (FMT) is the uplink power control, providing a few more dBs of extra margin at the expenses of a bulkier gateway RF front-end. For the user link, Adaptive Coding and Modulation (ACM) is nowadays a common fade mitigation technique which has been adopted by modern satellite broadband standards for the forward and the return link such as DVB-S2 and DVB-RCS2. However, these techniques might not be sufficient to provide the required availability level of the feeder links, particularly when the Q/V-band is used, as at these very high frequency rain phenomena can create severe link impairments (i.e. atmospheric attenuation) that, depending on the rain intensity and satellite elevation angle, can exceed 15-20 dB for a non negligible percentage of time during the year.

The "site diversity" concept is a well known strategy to mitigate the impact of fading events in the satellite feeder links ([1], [2]). As represented on FIG. 2A, in this approach, every active (or "nominal") gateway station $GW_1$, $GW_2$ is complemented by a backup gateway station $GW^B_1$, $GW^B_2$. In normal conditions, the backup gateway stations are idle; however, as illustrated on FIG. 2B, when a nominal gateway station (e.g. $GW_1$) undergoes an unacceptable level of fading (e.g. due to heavy rain) or a failure, then the corresponding backup gateway station ($GW^B_1$) is activated to replace it. The backup gateway station is usually located at a distance of several tens of kilometres from the nominal gateway location, greater than the size of a typical heavy rain cell, but within the same feeder beam. In this way the payload is fully transparent to this technique and does not need any specific modification compared to a traditional repeater. On the ground segment side, every pair of nominal—backup gateway stations needs to be connected through a high capacity network to re-route the traffic whenever a gateway switch occurs. This approach is quite practical for satellite networks characterized by one or few beams as a second gateway greatly improves the availability at an acceptable ground cost increase. Instead, for high capacity multi-beam satellite systems requiring a large number of gateways to support the high feeder link throughput, site diversity turns out to be very—and possibly unacceptably—costly in terms of the ground segment investment, as the already relevant number of gateway stations has to be doubled with respect to a diversity-less implementation.

An alternative approach, called "gateway soft diversity", was introduced in [3]. In this concept, a number of gateway stations (geographically separated but all located within the same feeder link beam) serve at the same time a certain amount of user beams, the sharing being implemented by means of a Frequency Division Multiple Access (FDMA) arrangement instead of the conventional full site diversity. In case of uplink fading causing one gateway to be in outage, the users assigned to the carriers served by the gateway in outage are switched by a central controller to the carriers managed by another gateway serving the same beam. As key advantages compared to the conventional approach, reference [3] mentions the fact in case of two gateways in diversity the gateway EIRP may be halved as each gateway has to handle half of the carriers with the same availability (but 50% feeder link bandwidth reduction). Furthermore assuming 4 carriers for the user downlink each soft diversity gateway will uplink only two carriers so there is about 2 dB reduction in the required gateway HPA OBO (however this OBO advantage will not be present when there gateway handles more than 4 carriers as it typically the case).

The "soft diversity" concept proposed in [3] assumes that the user terminal has frequency agility in terms of being able to tune on different downlink carriers according to instructions received by the radio resource management device. This capability is available on standard user terminals.

As disclosed by reference [3], "soft diversity" is a single feeder beam concept; its generalization to the case of multiple feeder beams is not straightforward. In any case, such a generalization could not provide a solution to the cost issue discussed above, as two or more gateway station would be required for each feeder beam. In fact, reference [3] does not allow redistributing the traffic among the other feeders in case one (or more) feeder links would become unavailable e.g. due to an intense rain event.

It should also be noted that, despite the gateway redundancy it introduces, the "soft diversity" concept cannot avoid a throughput reduction in case of fading affecting a gateway station, which is not the case of the conventional "site diversity" concept.

Reference [4] discloses two different approaches to mitigate the impact of fading events in the satellite feeder links at a lower cost than the conventional "site diversity" concept described above.

The first approach of reference [4] also exploits site diversity. However, diversity is not done on a one-to-one basis as in the conventional approach. Instead, the communication system comprises a first number of "nominal" gateway stations, and a second number of "diversity" gateway stations, situated outside the region of interest and shared among the multiple satellite feeder links. When a "nominal" gateway station is in outage, the corresponding data traffic is switched to an available "diversity" gateway. For example, in a case where $N_{GW}^{Req}=6$, two "diversity" gateway stations may be used, leading to a total of eight gateway stations instead of twelve as required by the conventional "site diversity" approach.

In the second approach of reference [4] there is no spatial diversity. However, all the gateway stations use only part of the available bandwidth, leaving a set of unused "diversity channels". If one or more gateways stations are in outage, their data traffic is dynamically allocated to the available "diversity channels" of the remaining gateway stations. Like the "soft diversity" approach of reference [3], this concept requires frequency-agile user terminals; however, fading does not necessarily results in a reduction of the throughput.

The two approaches of reference [4] can also be combined.

SUMMARY

The invention aims at improving the achievable performance in terms of capacity when fading events affect some of the feeder links, and the end to end link availability. The present invention also optimizes the payload architecture in terms of hardware required (to be understood in terms of number of equipment and associated power consumption, power dissipation and mass) to achieve the additional functionalities.

An object of the present invention is a satellite communication system comprising:
- a multibeam satellite for generating a plurality of feeder beams and a plurality of user beams over a region of interest;
- a plurality of spatially-separated gateway stations for providing feeder links to said multibeam satellite via respective feeder beams;
- a communication network interconnecting said gateway stations; and
- means for detecting at least one degraded feeder link;

characterized in that it further comprises control means for operating said gateway stations and multibeam satellite such that:
- in nominal conditions, a set of $N_{GW}$ gateway stations exchanges data with user terminals situated within the footprints of K>1 user beams, each of said gateway stations allocating a fraction of its bandwidth to each of said user beams, and each of said user terminals exchanging data with a single gateway station of the set; and
- in the event of degradation of one or more feeder links, data are switched from gateway stations associated to degraded feeder links to gateway stations associated to non-degraded feeder links using said communication network, whereby none of said user terminals experiences service outage.

Unlike in conventional multibeam satellite networks, each user beam is associated to several gateway stations. This enables the switching of data from a gateway station to another in case of outage.

Advantageously:
Each gateway station of said set may be configured to transmit and/or receive data using K carriers, a subset of which being allocated to a respective user beam, and conversely each of said user beam may comprise a multiple of $N_{GW}$ carriers, each being associated to a respective gateway station. More precisely, different carriers may be associated to user beams having adjacent footprints, while the same carriers may be associated to different feeder beams.

Each gateway station may be configured to react to a degradation of the corresponding feeder link by activating Adaptive Coding and Modulation to counteract fading impairments by reducing its throughput.

The satellite communication system may comprise a plurality of disjoint sets of gateway stations and a plurality of disjoint sets of user beams, and gateway stations belonging to a same set of gateway stations may exchange data with, and only with, users terminals situated within the footprints of user beams belonging to a same set of user beams.

According to a first embodiment of the invention, an operational bandwidth may be associated to each of said gateway station, and each of said gateway stations may be configured for using its whole operational bandwidth for exchanging data with user terminals. This first embodiment require no gateway redundancy; as a consequence, degradation of one or more feeder links causes a throughput reduction for all the user beams associated to said feeder link or links—but no complete interruption of the service as in conventional non-redundant systems.

According to a second embodiment of the invention, an operational bandwidth may be associated to each of said gateway station, and each of said gateway stations may be configured for:
- in nominal conditions, using only a part of its operational bandwidth for exchanging data with user terminals, leaving a remaining part unused; and
- in the event of degradation of a feeder link associated to a different gateway station, using all or a fraction of said unused part of its operational bandwidth for exchanging data with user terminals which, in nominal conditions, exchange data through the degraded feeder link. This second embodiment ensures that outage of one or more feeder links (up to a certain limit) has no effect on the data throughput. Of course, this is obtained at the expense of adding some additional gateways, but still with less oversizing compared to the conventional "site diversity" approach.

Another object of the present invention is a method of performing satellite communication comprising:
- operating a multibeam satellite generating a plurality of feeder beams and a plurality of user beams over a region of interest;
- operating a plurality of spatially-separated gateway stations for providing feeder links to said multibeam satellite via respective feeder beams; and
- monitoring degradation of said feeder links;

characterized in that the method further comprises:
- in nominal conditions, operating a set of $N_{GW}$ gateway stations for exchanging data with user terminals situated within the footprints of K>1 user beams, each of said gateway stations allocating a fraction of its bandwidth to each of said user beams, and each of said user terminals exchanging data with a single gateway station of the set; and
- in the event of degradation of one or more feeder links, switching data from gateway stations associated to degraded feeder links to gateway stations associated to non-degraded feeder links using a communication network, whereby none of said user terminals experiences service outage.

Advantageously:
Each gateway station of said set may transmit and/or receive data using K carriers, a subset of which being allocated to a respective user beam, and conversely each of said user beams may comprise a multiple of $N_{GW}$ carriers, each being associated to a respective gateway station. More particularly, different carriers may be associated to user beams having adjacent footprints, while the same carriers may be associated to different feeder beams.

Each gateway station may react to a degradation of the corresponding feeder link by activating Adaptive Coding and Modulation to counteract fading impairments by reducing its throughput.

Said gateway stations and said user beams may be partitioned in a plurality of disjoint sets, and gateway stations belonging to a same set of gateway stations may exchange data with, and only with, users terminals situated within the footprints of user beams belonging to a same set of user beams.

According to said first embodiment of the invention, an operational bandwidth may be associated to each of said gateway station, and each of said gateway stations may use its whole operational bandwidth for exchanging data with user terminals. In this embodiment there is no gateway redundancy, and degradation of one or more feeder links causes a throughput reduction for all the user beams associated to said feeder link or links.

According to said second embodiment of the invention, an operational bandwidth may be associated to each of said gateway station and:
- in nominal conditions, each gateway station may use only a part of its operational bandwidth for exchanging data with user terminals, leaving a remaining part unused; and
- in the event of degradation of a feeder link associated to a different gateway station, each gateway station may use all or a fraction of said unused part of its operational bandwidth for exchanging data with user terminals which, in nominal conditions, exchange data through the degraded feeder link. This embodiment uses gateway redundancy, and outage of one or more user links (up to a certain limit) causes no reduction of the data throughput.

Yet another object of the invention is a multibeam communication satellite payload for carrying out such a method, comprising:
- at least a set of feeder beam ports, for inputting and/or outputting respective feeder link signals;
- at least a set of user link ports (ULP) for inputting and/or outputting respective user link signals; and
- at least a forward link section interconnecting said feeder beam ports with said user link ports;
  characterized in that said forward link section comprises:
  - a first set of (wide-band) filter banks for separating signals inputted from each feeder beam port into a plurality of frequency slices, each of bandwidth equivalent to an overall user link bandwidth;
  - a set of frequency converters for translating and aligning said frequency slices in the spectral domain;
  - a second set of (narrow-band) filter banks for separating individual carriers contained within each said frequency slice; and
  - a set of (preferably narrow-band) signal combiners (e.g. frequency multiplexers) for combining individual carriers coming from different feeder beam ports into respective user link signals and outputting them through respective user link ports.

Advantageously:

The multibeam communication satellite payload may further comprise at least a return link section interconnecting said user link ports with said feeder beam ports, said return link comprising:
- a set of (narrow-band) filter banks for separating signals inputted from each user link ports into individual carriers;
- a first set of (preferably narrow-band) signal combiners (e.g. frequency multiplexers) for combining individual carriers coming from different user beams antennas into spectrally-aligned frequency slices of feeder link signals;
- a set of frequency converters for spectrally translating and staggering said frequency slices;
- a second set of (wide-band) signal combiners (e.g. frequency multiplexers) for combining spectrally-staggered frequency slices into feeder link signals to be outputted through said feeder beam ports. More particularly, such a multibeam communication satellite payload may comprise at least a pair of forward link sections and a pair of return link sections, each feeder beam port being connected to both forward link sections and to both return link sections via a respective orthomode transducer; and each user link port being connected to a single forward link section and a single return link section.

The multibeam communication satellite payload may comprise $M_C>1$ sets of feeder beam ports, $M_C$ sets of user link ports and $M_C$ forward link sections or pairs of forward link sections, each forward link section or pair of forward link sections being only connected to feeder beam ports belonging to a same set and to user link ports belonging to a same set. More particularly, the payload may comprise $M_C>1$ sets of feeder beam ports, $M_C$ sets of user link ports and $M_C$ return link sections or pairs of return link sections, each return link section or pair of return link sections being only connected to feeder beam ports belonging to a same set and to user link ports belonging to a same set.

In said or each said forward link section:
- said first set of (wide-band) filter banks may comprise a number of filters which is higher than the number of filter banks of said second set of filter banks; and
- each filter bank of said second set of filter banks may be connected to a filter of a filter bank of said first set of filter banks via a respective ($N_{GW}$+P): $N_{GW}$ non blocking switch, ($N_{GW}$+P) being the number of feeder beam ports belonging to each set and P being a positive integer.

In said or each said return link section:
- said first set of signal combiners may comprise a number of signal combiners which is lower than the number of signal combiners of said second set of signal combiners; and
- each signal combiner of said first set of signal combiners may be connected to at least one wide-band signal combiner of said second set of signal combiners via a respective ($N_{GW}$+P): $N_{GW}$ non blocking switch (NBS), ($N_{GW}$+P) being the number of feeder beam ports belonging to each set and P being a positive integer.

BRIEF DESCRIPTIONS OF THE DRAWINGS

Additional features and advantages of the present invention will become apparent from the subsequent description, taken in conjunction with the accompanying drawings, wherein:

FIG. 6 illustrates an exemplary forward link frequency plan using dual polarization for implementing the method of FIGS. 3A and 3B;

FIG. 7I illustrates details of FIG. 7C;

DETAILED DESCRIPTION

Unless the contrary is specified, the following description will focus on the forward link, as this is the most challenging part of the diversity scheme. The concepts discussed are however intended to be also applicable to the return link in a symmetrical way.

The different embodiments of the invention exploit the intrinsic spatial diversity provided by the multiple gateway stations by interconnecting them. Gateway redundancy can also be provided (second embodiment) or not (first embodiment), depending on whether some system capacity reduction in case of fading is acceptable or not.

The first embodiment of the invention exploits the presence of $N_{GW}=N_{GW}^{Req}$ gateway stations to ensure continuity of service in case one or more of them go in outage due to fading, without gateway station redundancy. For the sake of simplicity, from now on the required number of gateway stations, $N_{GW}^{Req}$, will be referred to simply as N, and the term "gateway" will be used instead of "gateway station".

Figure 1A:
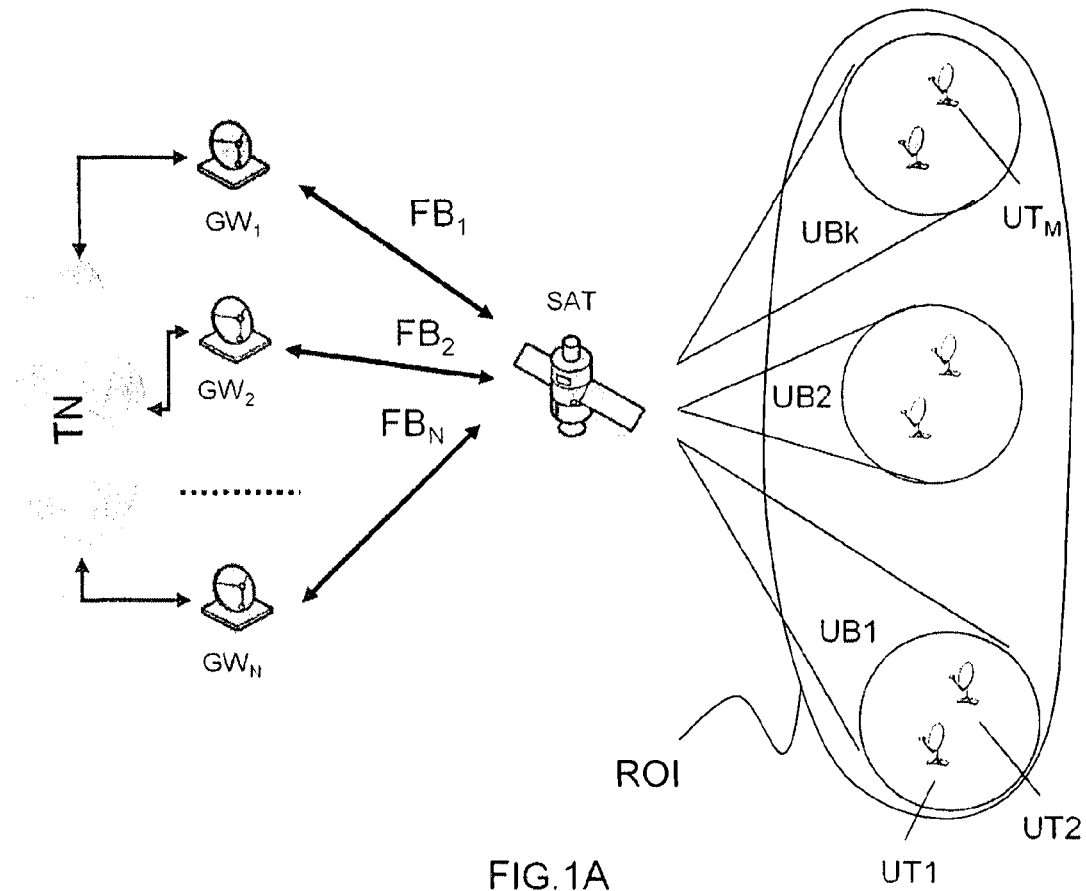
FIGS. 1A and 1B illustrate a multibeam satellite network having a plurality of gateway stations.
Figure 1B:
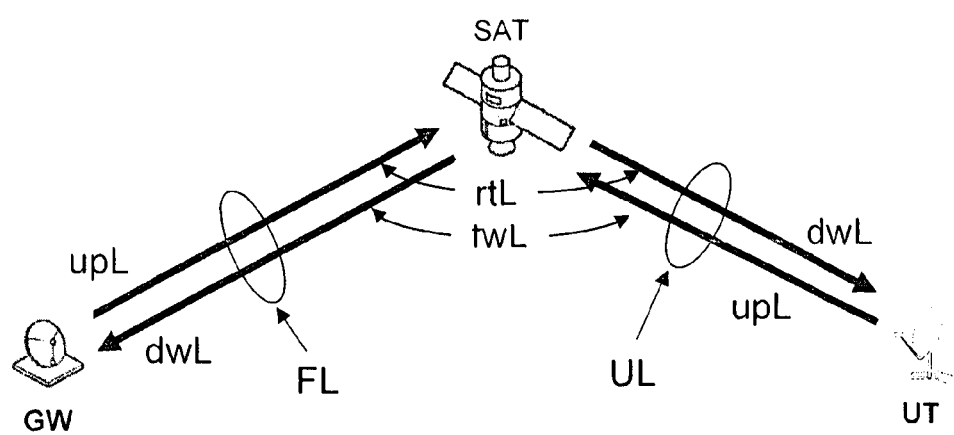
Figure 2A:
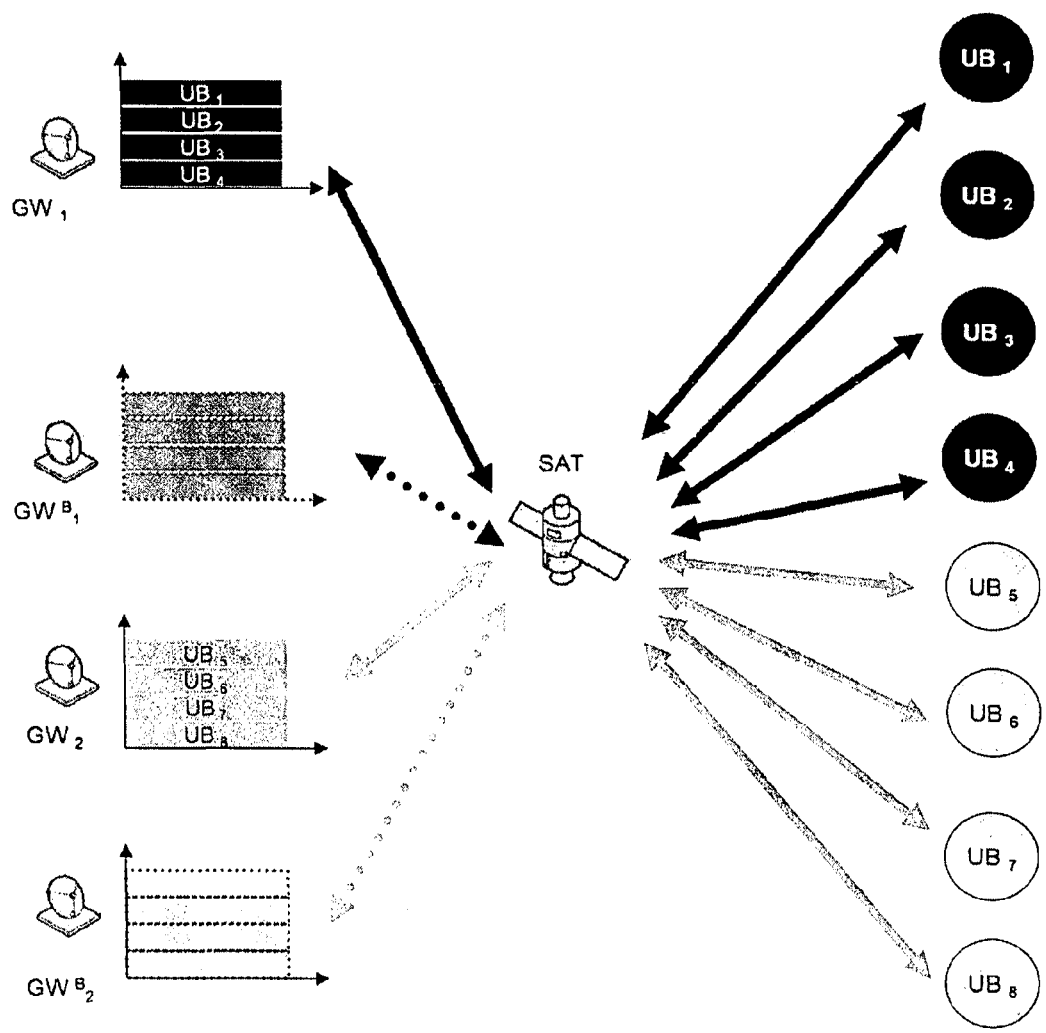
FIG. 2A illustrates a "site diversity" approach to mitigate the impact of fading events in the satellite feeder links in which an active (or "nominal") gateway station is complemented by a backup gateway station.
Figure 2B:
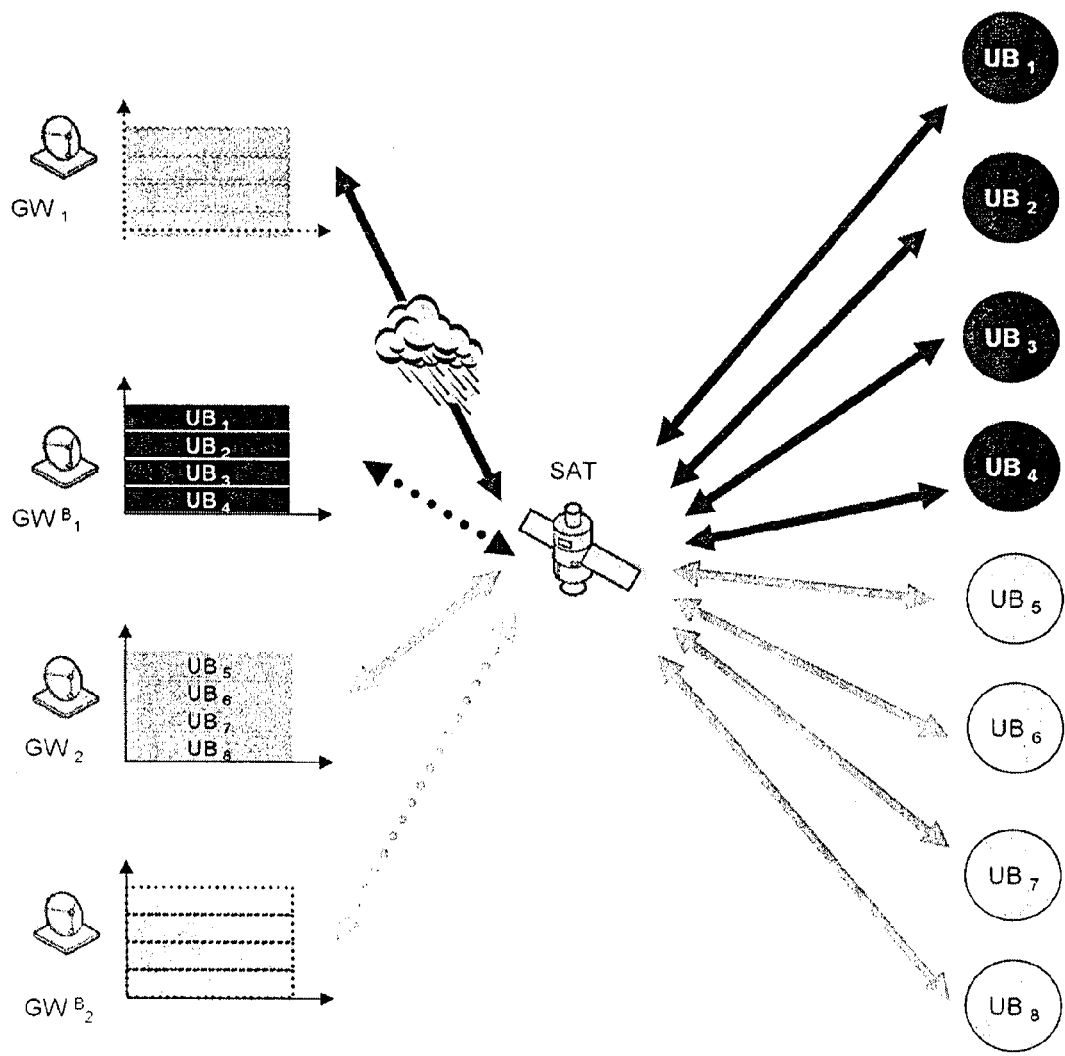
FIG. 2B illustrates that when a nominal gateway station undergoes an unacceptable level of fading or a failure, then the corresponding backup gateway station is activated to replace it.
Figure 3A:
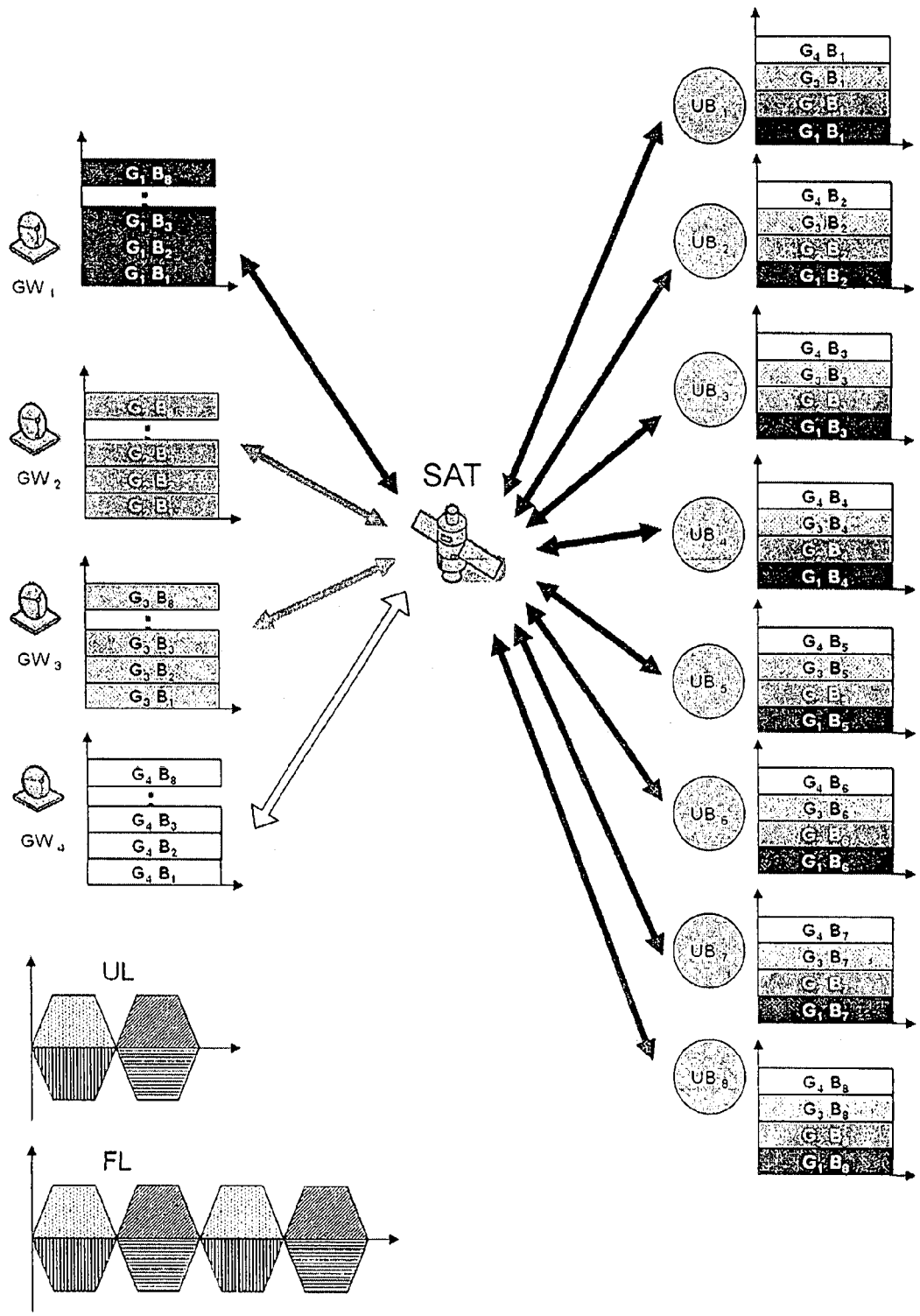
FIGS. 3A and 3B illustrate the operation of a system and method according to a first embodiment of the invention, in normal conditions and with a gateway station experiencing atmospheric fading, respectively.
Figure 3B:
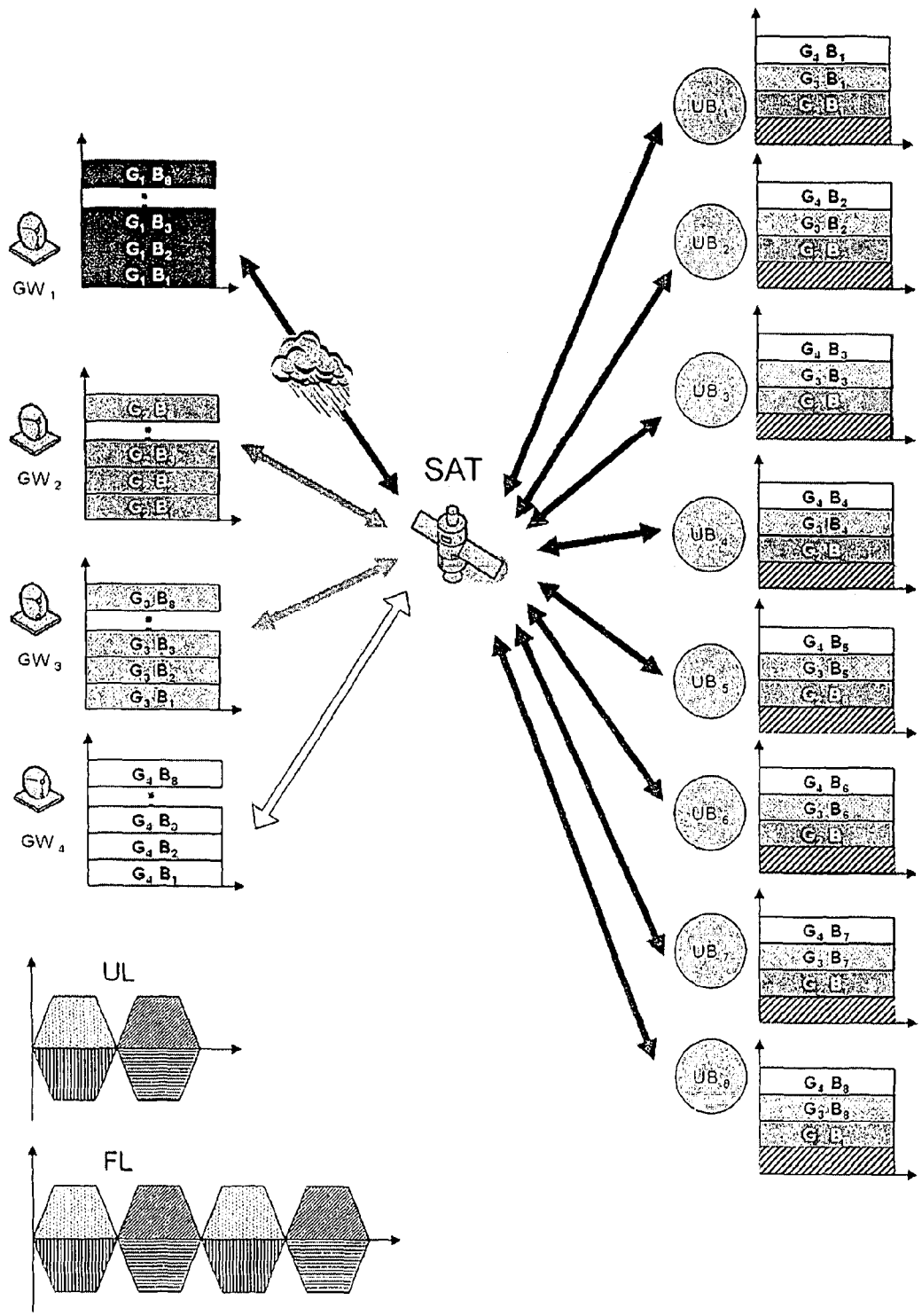

The first embodiment of the invention is illustrated by FIGS. 3A-3B, representing an exemplary satellite network comprising $N_{GW}=4$ gateways $GW_1$-$GW_4$ and K=8 user beams $UB_1$-$UB_8$. Each gateway transmits over K=8 carriers, each associated with a respective user beam; so, on FIG. 3A, $G_1B_1$ is the carrier of gateway $GW_1$ associated to user beam $UB_1$, and so on. Overall there are $K \times N_{GW}=8 \times 4=32$ carriers arriving at the satellite payload. Reciprocally, each user beam is connected to carriers emitted by different gateways. This is a significant difference over prior art systems, wherein each user beam is associated to a single gateway. It should be noted, however, that several user terminals are situated within the footprint of each user beam, and that in general each user terminal will receive data from a single gateway over a single carrier; otherwise stated, the user terminals belonging to a same user beam share said user beam using FDMA (possibly, on top of usual DVB-S2 Time Division Multiplexing).

In the lower-left part of FIG. 3A (and FIG. 3B) is reproduced a frequency-polarization plan, showing that each user link uses four carriers (two frequency bands, two polarization states) and the each feeder link uses eight carriers (four frequency bands, two polarization states).

When e.g. gateway $GW_1$ goes in outage due to fading, the $G_1B_n$ (n=1-8) feeder link carriers are lost and therefore the system capacity is reduced accordingly i.e. ¼ of the capacity is lost. On the user side the users which were served by the $G_1B_n$ (n=1-8) carriers will be handed-off to the other carriers (see FIG. 3B), and gateway $GW_1$ traffic will be rerouted to gateways $GW_2$, $GW_3$ and $GW_4$. Being the overall capacity reduced by the loss of ¼ of the overall user carriers the individual bit rates will be reduced accordingly taking into account Q.o.S. (Quality-of-Service) policies.

The proposed approach to have an FDMA sharing on the user beam of different gateways allows seamless hand-off from one gateway to another with no on-board carriers rerouting but simply retuning of the user terminal carrier frequency.

In practice, not to reduce too much the carrier throughput, no more than 3-4 carriers per user beam shall be envisaged (the bit rate per carrier is inversely proportional to the number of carriers in the given band). Thus the concept can be scaled-up but taking into account this limitation. As an example, it is possible to consider a system with 160 user beams and 20 gateways. Assuming that the number of carriers/beam is limited to 4, each carrier being assigned to a different gateway, a total of 640 carriers will have to be routed by the payload to the 20 gateways, i.e. 32 carriers/gateway or 8 user beams/gateway. So in this case each beam will be served by ⅕ of the overall number of gateways with reduced (four-fold) site diversity. As a result, the 20 gateways are partitioned into $M_C=5$ clusters, each comprising $N_{GW}$ gateways, and each cluster serves $K_C=K/M_C=160/5=32$ user beams (from now on $N_{GW}$ and K will be used to mean either the total number of gateways/user beams, or the number of gateway/user beam per cluster; the context will make the exact meaning clear). When a gateway is in outage, its traffic is only switched to gateways belonging to the same cluster.

Figure 4:
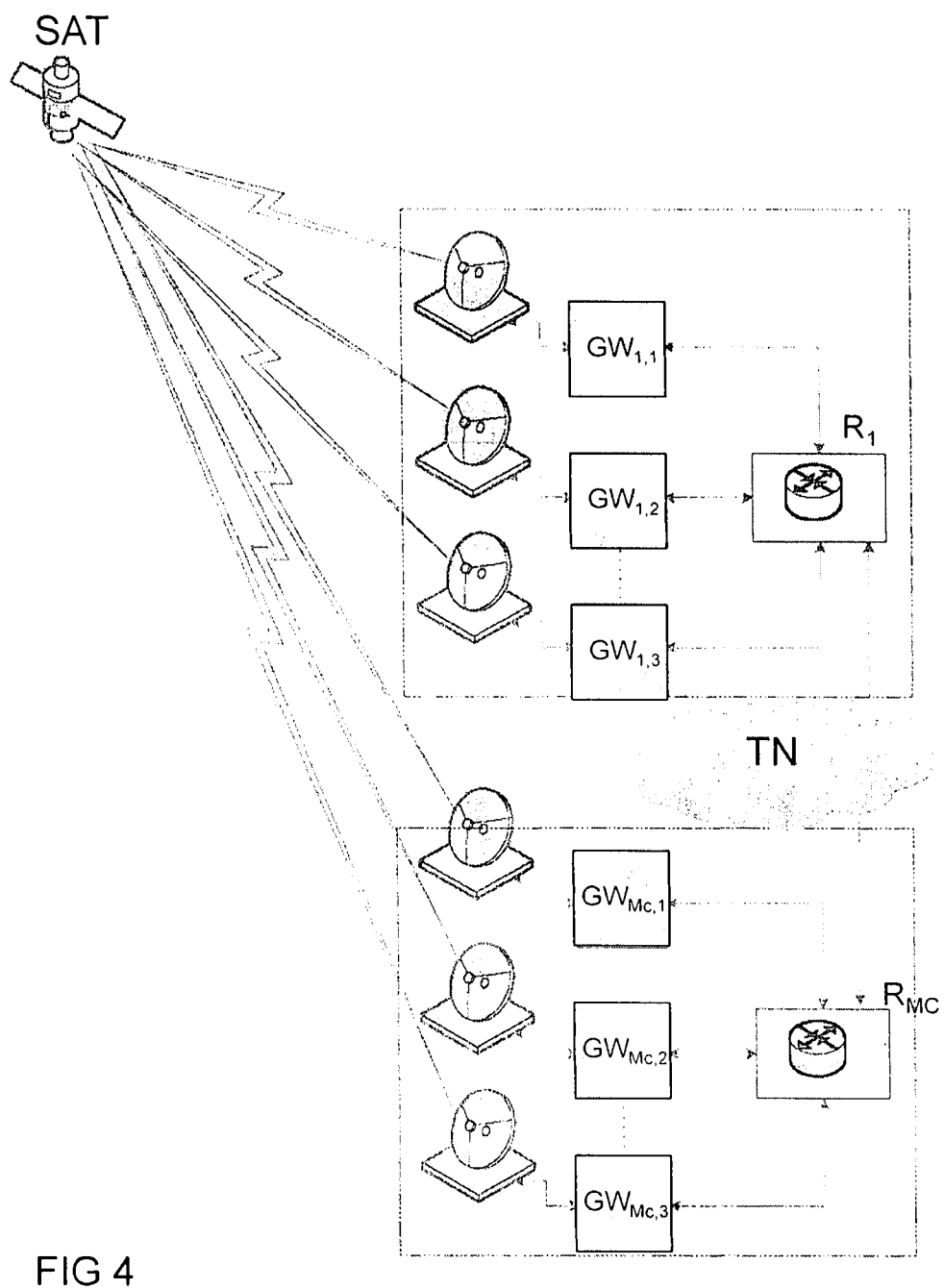
FIG. 4 is a functional diagram of the ground segment of the system of FIGS. 3A and 3B.

FIG. 4 illustrates a functional block diagram of the ground segment of a system according to the first embodiment of the invention, showing in particular the above-mentioned clustering of the gateways. On the figure, $GW_{m,n}$ is the $n^{th}$ gateway of the m$^{th}$ cluster. All the gateways of a same cluster are connected to a router/control unit ($R_1$ for cluster 1 ... $R_{MC}$ for cluster $M_C$) which routes traffic from/to the network NT to/from the serving gateway. The router control unit monitors all the $M_C$ cluster gateways and detects imminent gateway outage conditions using techniques which will be discussed below. Then, the router/controller starts routing the traffic from/to the network to/from the other operational gateways of the same cluster, reducing service bit rates to accommodate the overall system capacity reduction. The same cluster architecture is repeated $M_C$ times. Each cluster, however manages gateway resources independently from the others.

Figure 5A:
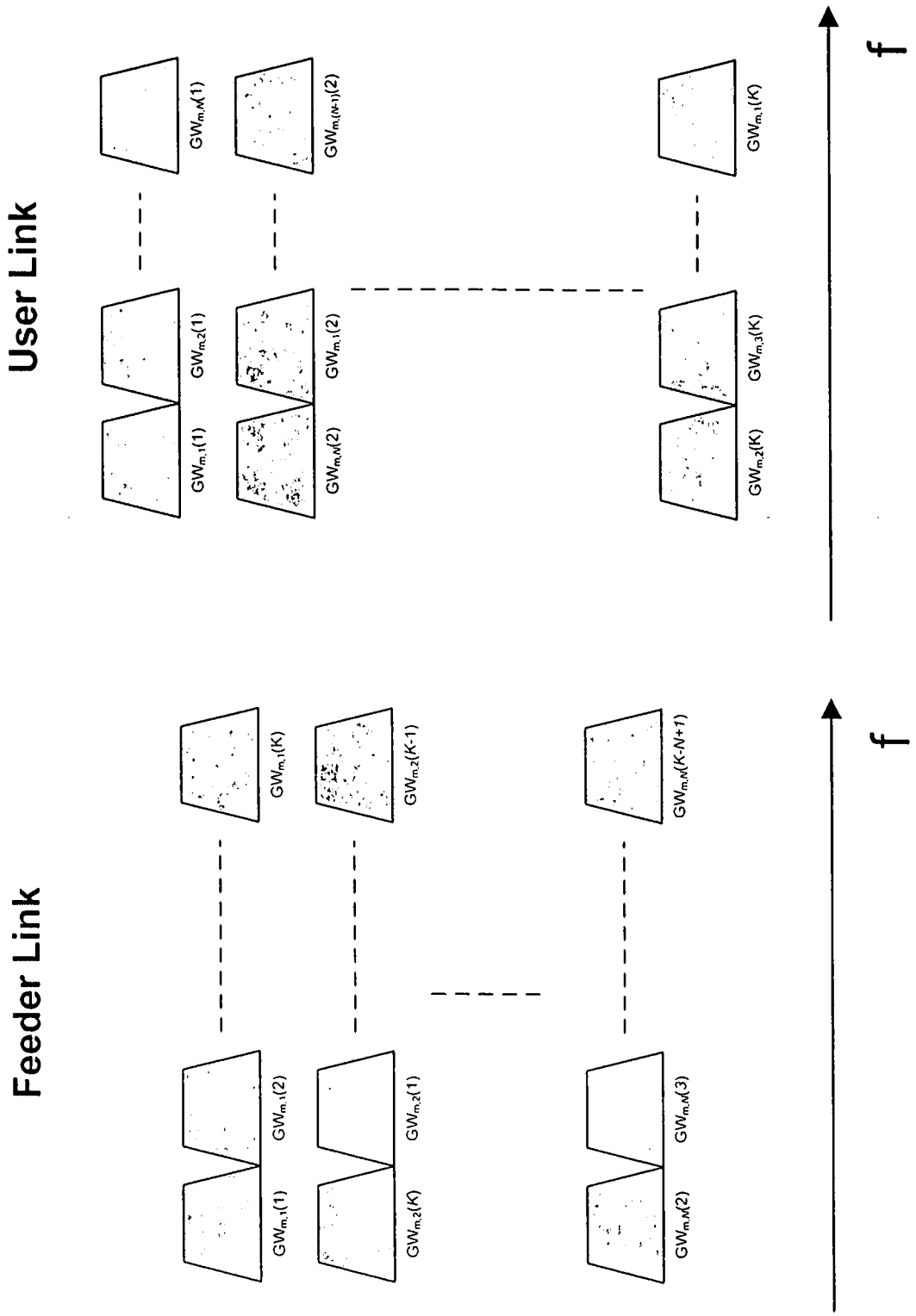
FIGS. 5A and 5B illustrate exemplary feeder and user link frequency plans for implementing the method of FIGS. 3A and 3B, in normal conditions and with a gateway station experiencing atmospheric fading, respectively.
Figure 5B:
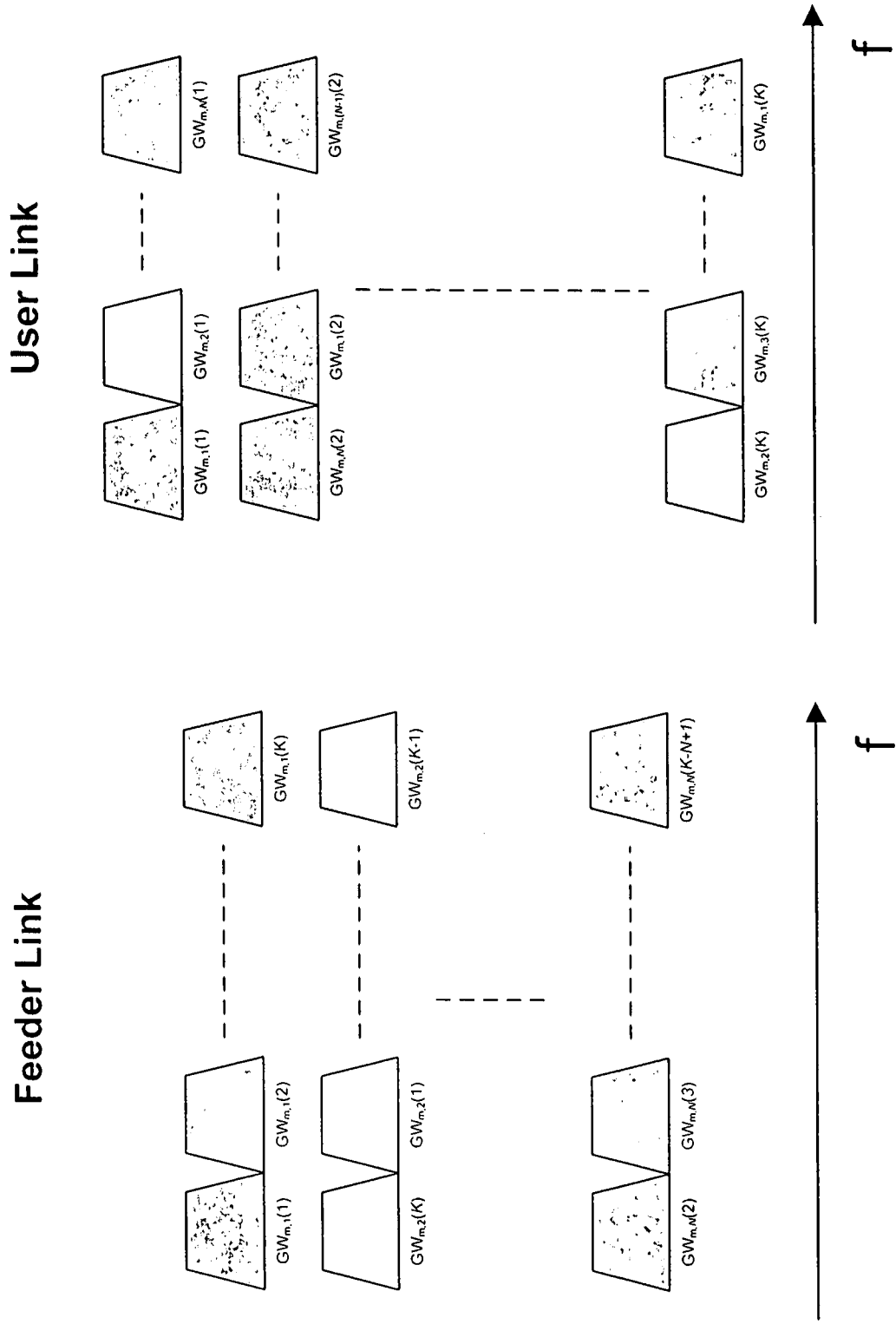

FIG. 5A illustrates the overall frequency plan for the satellite network of FIG. 4; for the sake of simplicity, single polarization is considered, but extension to double polarization is straightforward. $GW_{m,n}(k)$ refers to the carrier of the n$^{th}$ gateway of the m$^{th}$ cluster, serving the k$^{th}$ user beam. In the left part of the figure, representing the feeder link, each row corresponds to a different gateway, while in the right part of the figure, representing the user link, each row corresponds to a different user beam. In both parts of the figure, the horizontal axis represents the frequency f.

It should be noted that, in the example represented on this figure, the first user beam is allocated the lowest-frequency carrier of gateway (m, 1), the second-lowest frequency carrier of gateway (m, 2) and so on; the second user beam is allocated the second-lowest frequency carrier of gateway (m, 1), ..., the highest-frequency carrier of gateway (m, $N_{GW}$–1) and the lowest-frequency carrier of gateway (m, $N_{GW}$), etc. Otherwise stated, the carriers are associated to the user beams according to a circular permutation scheme.

There are several possible ways to handle link outage detection. A preferred approach is based on a make before it breaks policy. This means that the gateway shall be able to hand-off the traffic being carried out before the feeder link attenuation reaches critical limits. The most reliable approach to detect the level of the gateway feeder link fading is to use a satellite beacon operating at a frequency close to the one of the feeder link. As it is likely that only one beacon is present on the satellite ideally it will be preferable to have the beacon operating at the feeder uplink frequency (i.e. V-band in case of a Q/V-band feeder link). Permanent measurement of the beacon received gateway power $P_b^{Rx}$ [dBm] and comparison with the nominal power level $[P_b^{Rx}]_{nom}$ [dBm] will allow to timely trigger a gateway hand-off procedure. The simplest approach is to use a set of two received beacon power thresholds $T_1$ [dBm] and $T_2$ [dBm] with $T_1 < T_2$ where $T_2[dBm]-T_1[dBm]$ represents the hysteresis margin. When $P_b^{Rx} < T_1$ the gateway hand-off process is triggered. When the fading event is over $P_b^{Rx} > T_2$ and the gateway can start recovering back the traffic from other gateways.

The $T_1$ and $T_2$ thresholds also depend on the strategy for triggering Adaptive Coding and Modulation (ACM), if the latter is applied, as it will be discussed below.

Assuming that there is a certain gateway Up Link Power Control (ULPC) range $\Delta P_{ULPC}$ [dB], then the following conditions needs to be verified:

$$T_1[dBm] = [P_b^{Rx}]_{nom}[dBm] - \Delta P_{ULPC}[dB] + MG[dB] \quad (3)$$

Where the Margin MG is given by:

$$MG[dB] = S_{fad}^{Max}[dB/s] \cdot T_{HO}[s] + IM[dB] + ACM_{range}^{FL}[dB] \quad (4)$$

Where $S_{fad}^{Max}$ [dB/s] [dB/s] is the maximal fading slope, $T_{HO}$[s] the handover time and IM [dB] is an implementation margin. The parameter $ACM_{range}^{FL}$ [dB] represents the dynamic range allowed in the feeder link for exploiting the Adaptive Coding and Modulation (ACM) capabilities. This value corresponds to the difference (in dB) in SNIR between the SNIR required for achieving the target packet error rate (PER) by current waveform, and the Signal-to-Interference and Noise Ratio (SNIR) required by the waveform (or "MODCOD") at the lowest spectral efficiency included in the system air interface.

ACM is a powerful fade mitigation countermeasure that is nowadays typically adopted in broadband multi-beam access networks. For current Ku and Ka-band systems, the feeder link is typically sized with a high link margin so that the overall system availability figure is typically dominated by the user link. Therefore, although ACM is operating on the end-to-end (e.g. gateway-to-user) basis, it is mainly designed for compensating the user link fading. This is because if ACM has to counteract the feeder link fading, the impact on capacity and system availability will be noticeable as all users belonging to the same gateway will be affected by the feeder link throughput reduction. From the above discussion it is expected that exploiting ACM to also mitigate the impact of the feeder link fading may enhance the overall system performance even when using (smart) gateway diversity. It has to be remarked that as ACM is working on an end-to-end basis, it will anyway automatically kick-in if no other fading countermeasures will be available. The capacity impact of ACM exploitation for mitigating the feeder link fading will depend on the specific system parameters.

In the first embodiment of the invention, discussed here, ACM is triggered as soon as the end-to-end SNIR requires a modification of the spectral efficiency of the waveform transmitted. Only when the user terminal SNIR for the majority of users is getting close to the threshold of the most protected MODCOD supported by the system the feeder link carrier is disabled and residual traffic handed-off to other gateways if possible. It is remarked that due to the reduced data rate transported by the faded carrier, a part of the users originally allocated to those carrier will be moved immediately to other unfaded feeder link carriers in order to maintain as much as possible the individual users' quality of service. This approach of using the full range of ACM is justified by the fact that the user beam bandwidth allocated to the faded gateway cannot be reused by other gateways.

As far as the space segment is concerned, the implementation of the first embodiment of the invention requires a dedicated multibeam satellite payload. In particular, it is required to filter separately every (or a number of adjacent) carrier and recombine them taking different carriers from different feeder links.

An exemplary satellite payload for implementing said first embodiment of the invention will then be described considering the forward link frequency plan of FIG. 6. The upper part of the figure represents the feeder link, using 64 carriers, 32 of which are transmitted with vertical polarization (V) and 32 with horizontal polarization (H). These carriers come from $N_{GW}=4$ gateways (16 carriers/gateway) and allow serving K=64 user beams, with $N_{Carriers/Beam}=4$. As discussed above, each user beam takes a single carrier from each feeder link (i.e. from each gateway). As represented by the lower part of FIG. 6, a 4 colours frequency reuse scheme can be used for the user link multibeam coverage: a first colour B1 corresponds to the lowest half of the bandwidth allocated to the user link and to right-handed circular polarization (RHCP); B2 corresponds to the highest half of said bandwidth and also RHCP; B3 uses the same part of the spectrum as B1 but left-handed circular polarization (LHCP); B4 uses the same part of the spectrum as B2 but LHCP. Each user beam possesses a bandwidth of 250 MHz ($B_B^{UL}$=250 MHz) and 4 carriers ($N_{Carriers/Beam}$=4) from 4 different gateways are mapped in each user link beam.

Figure 7A:
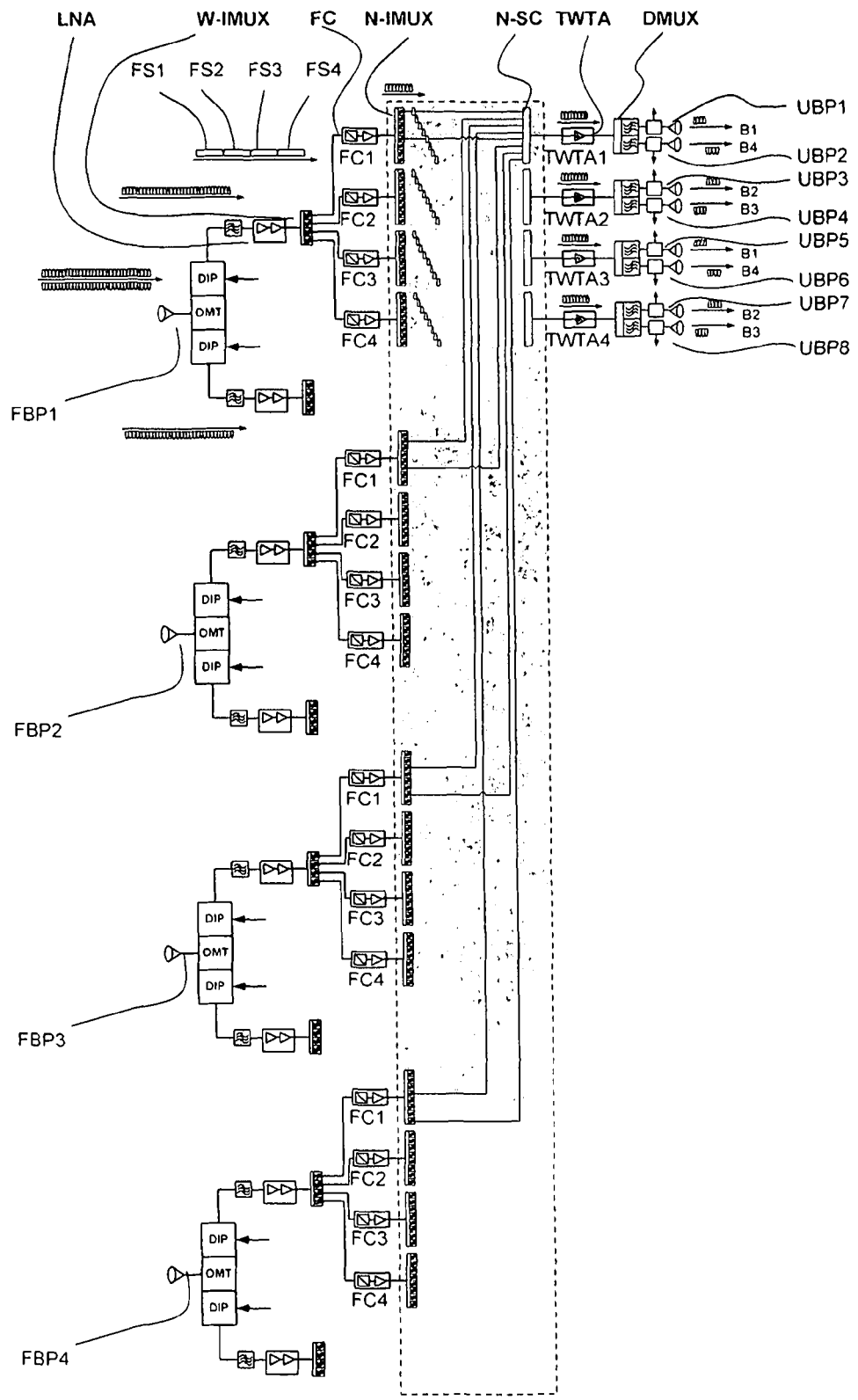
FIG. 7A is a simplified scheme of the forward link section of a satellite payload implementing the space segment of the system of FIGS. 3A and 3B with the exemplary frequency and polarization plan of FIG. 6.
Figure 7B:
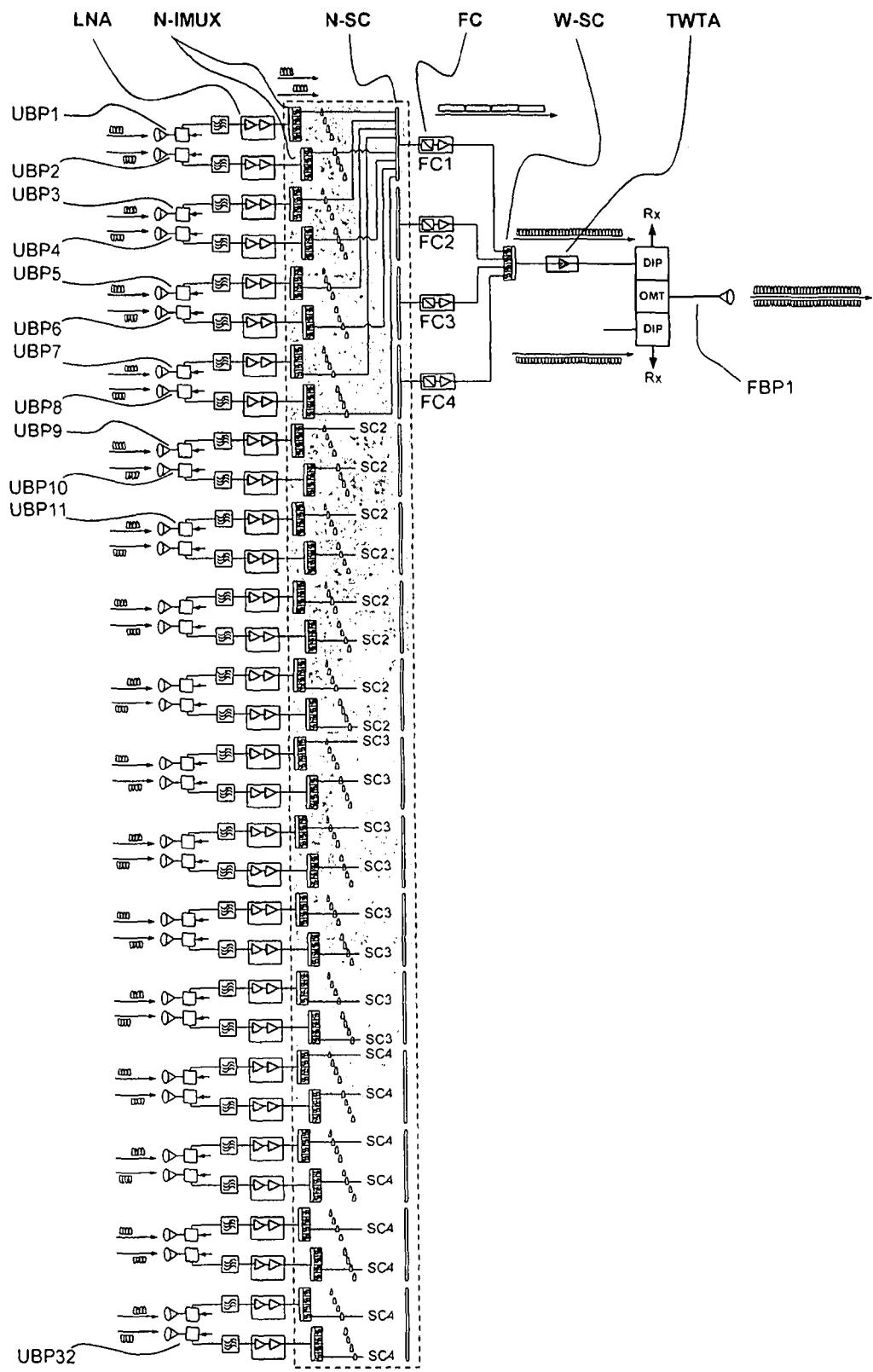
FIG. 7B is a simplified scheme of the return link section of a satellite payload implementing the space segment of the system of FIGS. 3A and 3B.
Figure 7C:
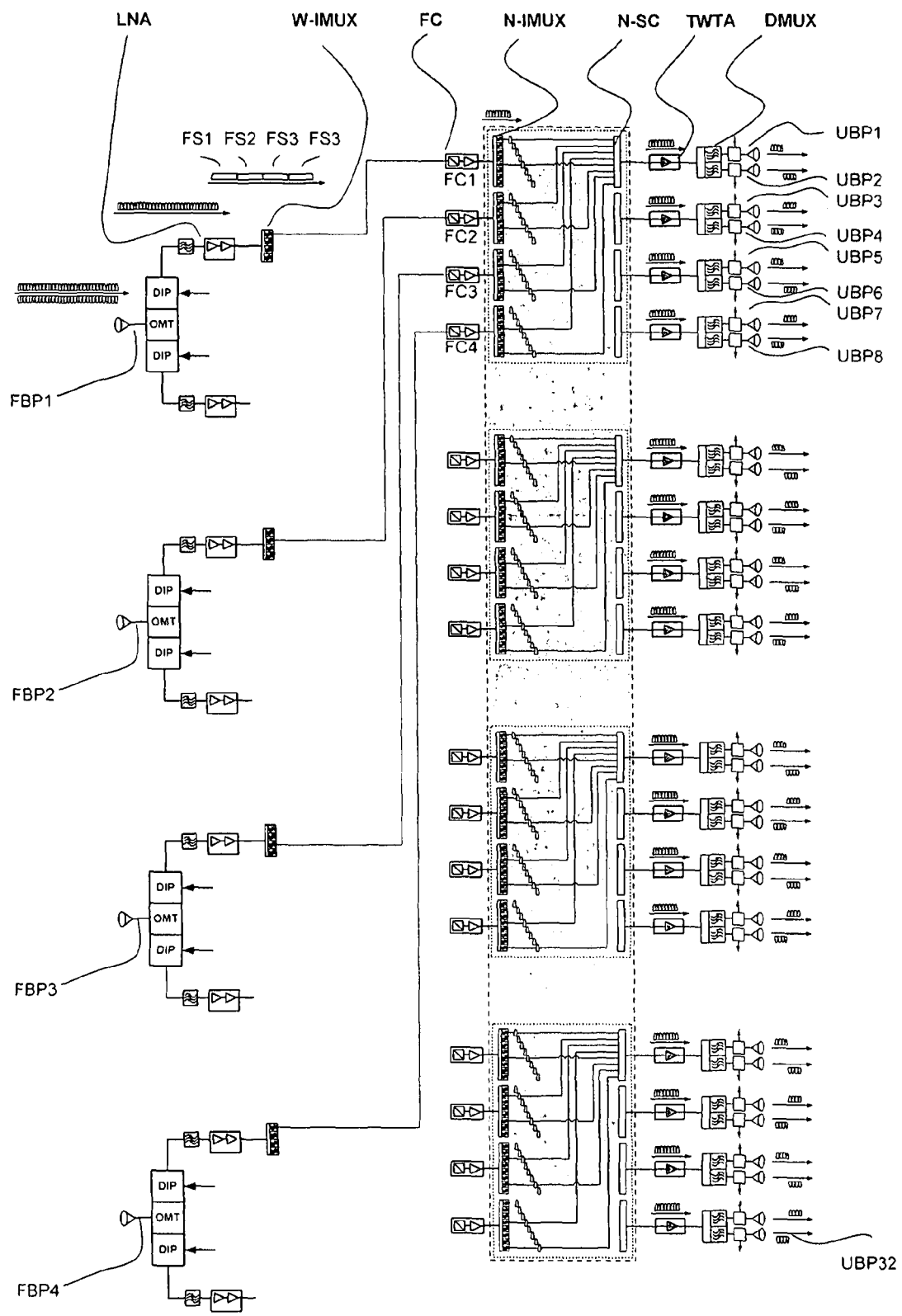
FIG. 7C is a simplified scheme of the forward link section of the satellite payload of FIG. 7A with minimized interconnection lengths.
Figure 7D:
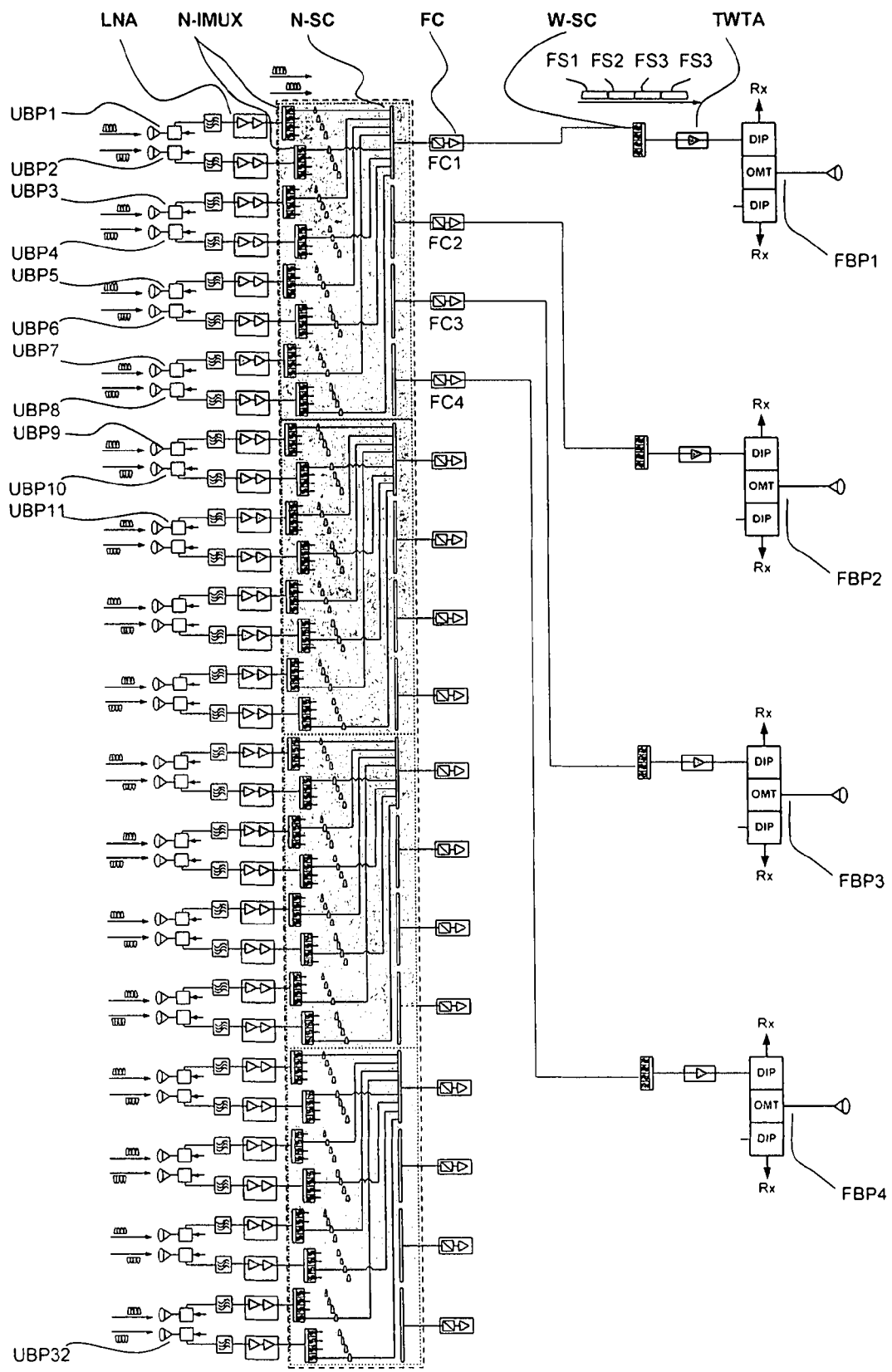
FIG. 7D is a simplified scheme of the return link section of the satellite payload of FIG. 7B with minimized interconnection lengths.
Figure 7E:
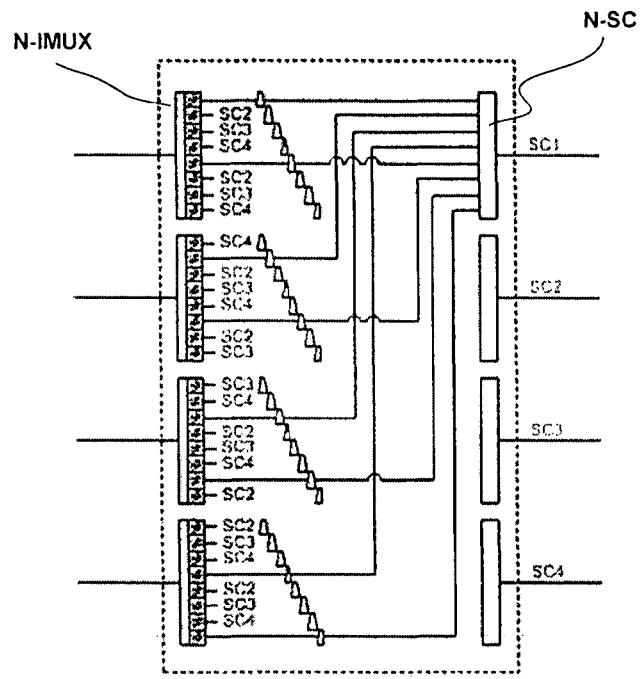
FIG. 7E illustrates the interconnection topology of a set of narrow-band input multiplexers and signal combiners for the forward link section of the satellite payload of FIG. 7C.
Figure 7F:
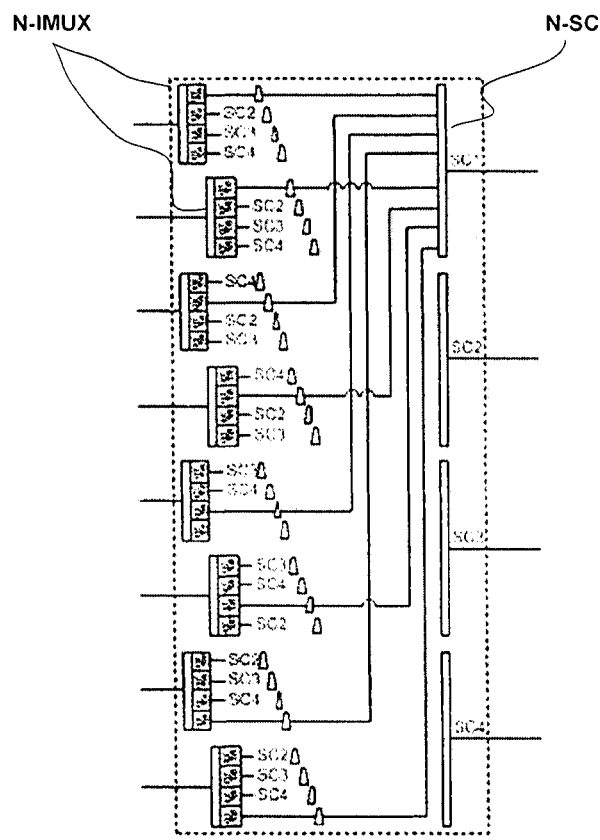
FIG. 7F illustrates the interconnection topology of a set of narrow-band input multiplexers and signal combiners for the return link section of the satellite payload of FIG. 7D.
Figure 7G:
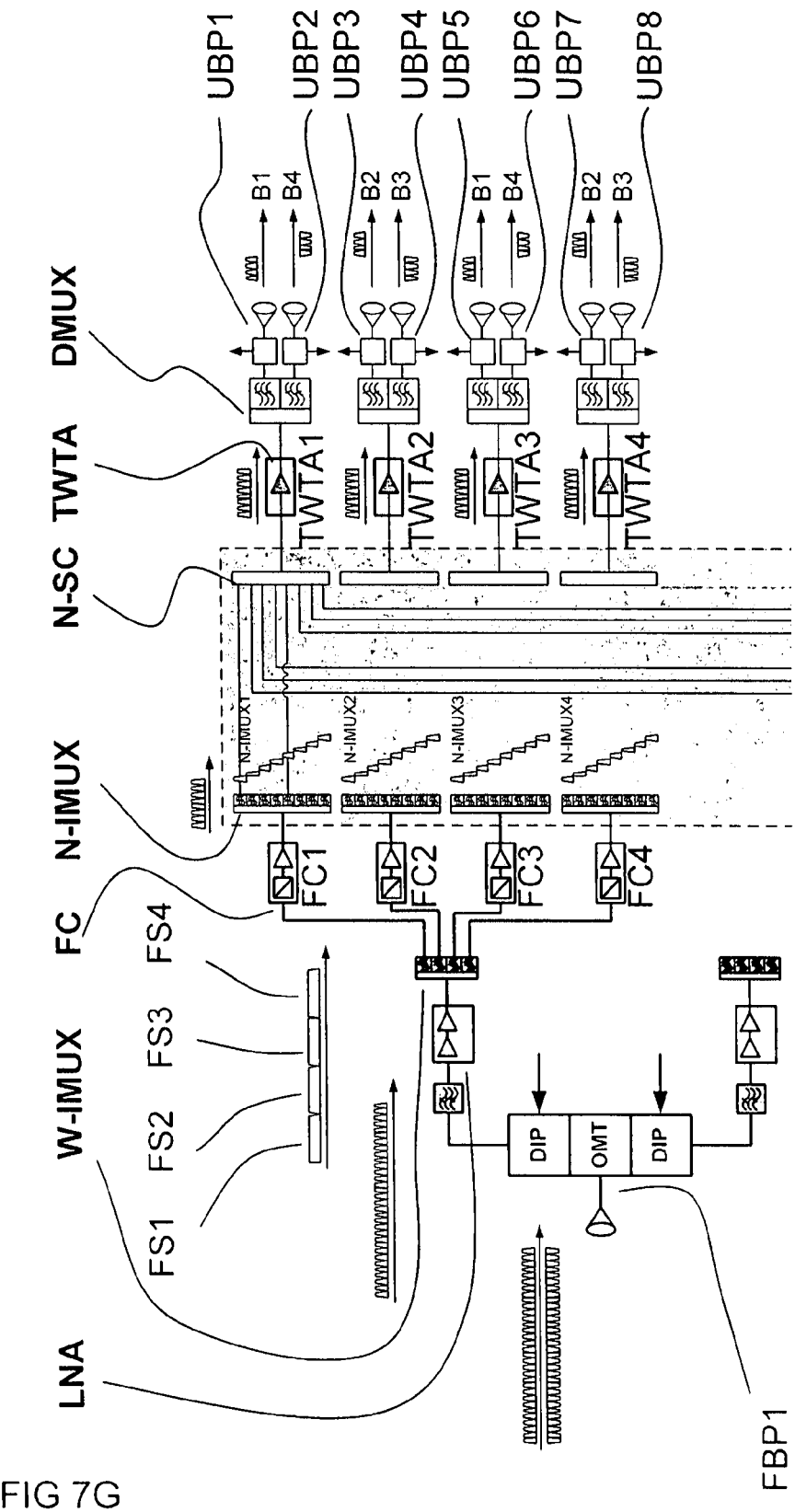
FIG. 7G illustrates details of FIG. 7A.

FIGS. 7A and 7G (magnified detail) illustrate the structure and operation of the forward link section of a satellite payload for implementing the first embodiment of the invention. To avoid surcharging the figure, only the signal path leading to the formation of a pair of user beams (of colours B1 and B4) is illustrated.

The 64-carrier signal of each feeder link is received at a respective feeder beam port FBP1-FBP4; from now on, only the signal received at FBP1 will be considered (the signal received at the other feeder port undergoes an equivalent processing). The horizontal (H) and vertical (V) polarization components of said signal are separated by an orthomode transducer OMT; from now on only the H component will be considered (the V component undergoes an equivalent processing). The orthomode transducer and the feeder beam ports are common to the return link section of the payload, where they are used in transmission (Tx); diplexers DIP are provided to separate the two sections. The H component of the feeder signal is filtered and pre-amplified by low noise amplifier LNA. Then, a first filter bank forming a first (wide-band) input multiplexer W-IMUX, separates the signal in 4 frequency slices FS1-FS4, each of bandwidth equivalent to the overall User Link Bandwidth $B^{UL}$=500 MHz. Each frequency slice includes $$\frac{N_{Carriers/Baeam} \cdot N_P^{UL}}{N_C^{UL}} = 8$$

carriers which are block frequency converted to the user link frequency by respective frequency converters FC1-FC4. From now on, only the processing of FS1 will be considered (the other frequency slices undergoes an equivalent processing).

The number of frequency converter is determined by the ratio $$\frac{B^{FL}}{B^{UL}}$$

between the frequency bandwidth allocated to the feeder link, $B^{FL}$, and the frequency bandwidth allocated to the user link, $B^{UL}$. After frequency conversion, all the frequency slices are aligned. The carriers composing each frequency slice are then separated by means of second (narrow-band) filter banks N-IMUX forming respective second input multiplexers N-IMUX1-N-IMUX4 and the carries from different frequency slices and different feeder links that are directed to a same user beam are recombined by means of a low-level narrow band signal combiner SC1-SC4. The resulting signals are then generally controlled in level and linearised (e.g. by means of respective Channel Amplifiers), amplified in power, e.g. by means of respective Travelling Wave Tube Amplifier TWTA1-TWTA4) and outputted through respective user link ports ULP1-ULP8 to be transmitted through the multibeam antenna to the relevant user beam.

The user link ports are common to the return link section of the payload, where they are used in reception (Rx); again, diplexers DIP are provided to separate the two sections.

In the exemplary embodiment considered here, the TWTA RF power capability exceeds the required RF power, so that two user beams occupying different frequencies are amplified through each TWTA and then separated in frequency by means of a high power frequency demultiplexer DMUX.

In alternative implementations of the inventive payload the second input multiplexer could be realised with a reduced number of bandpass filters with multiple passband response (e.g. dual) for each output. This configuration would allow reducing the number of filters as well as the complexity of the combiners and associated RF harness.

The gateway-to-beam connectivity offered by the satellite payload allows a progressive deployment of the gateways according to the traffic growth.

Figure 7H:
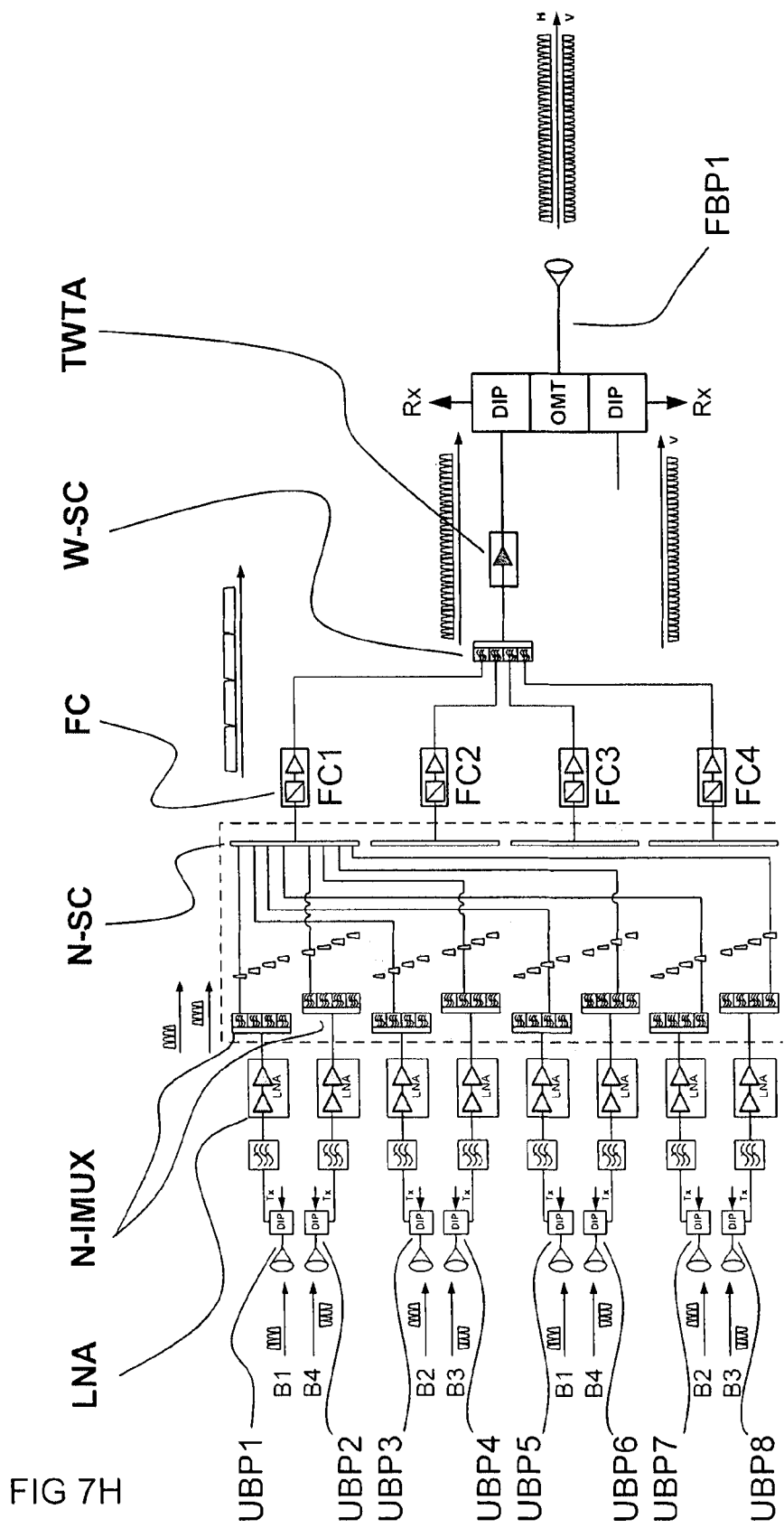
FIG. 7H illustrates details of FIG. 7B.
Figure 71:
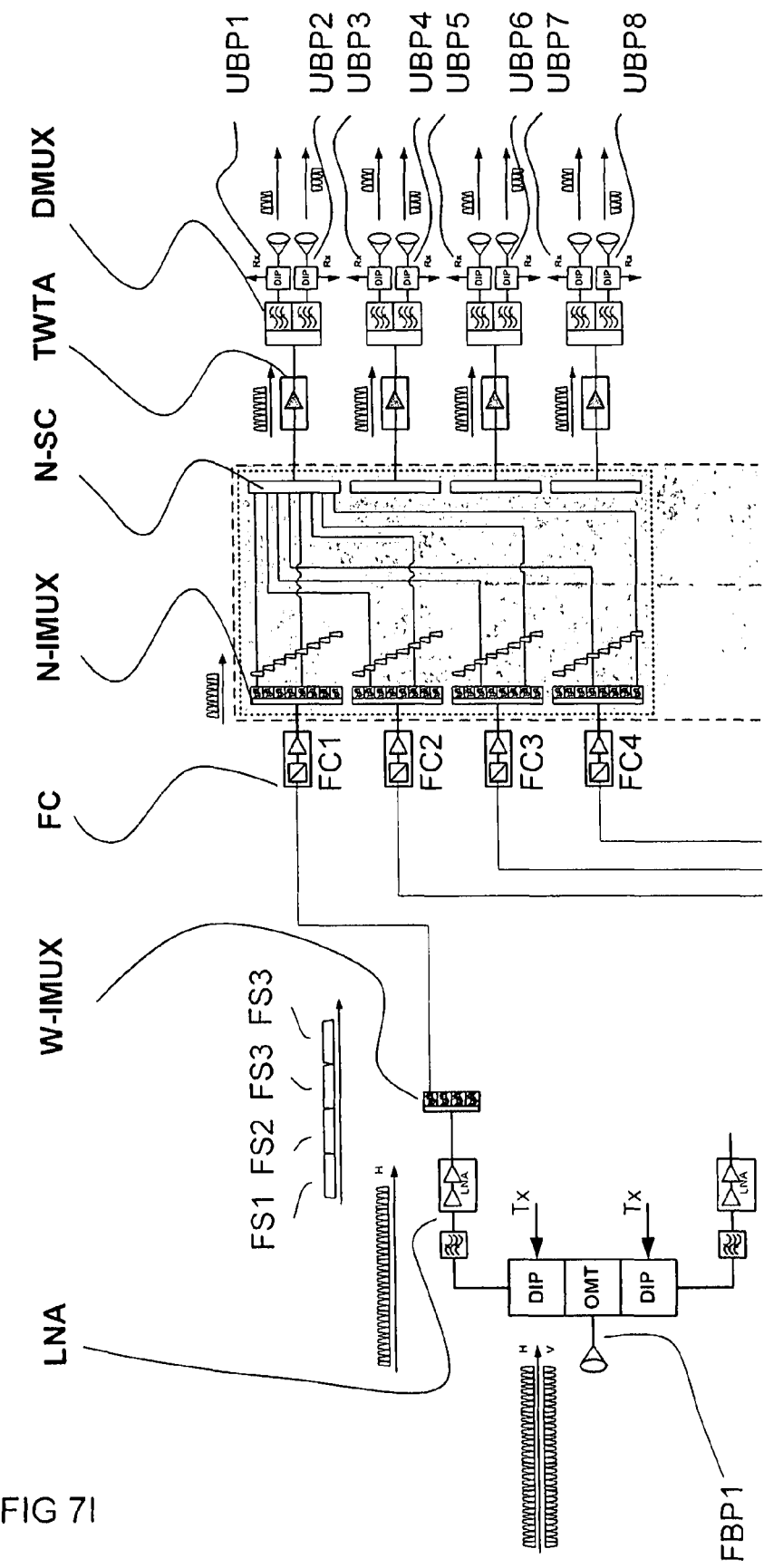

The structure of the return link section of the satellite payload, illustrated on FIGS. 7B and 7H (magnified detail), is reciprocal to that of the forward link section: input and output are exchanged, and so are low-noise amplifiers and power amplifiers; filter banks are replaced by signal combiner, and vice-versa.

Figure 7J:
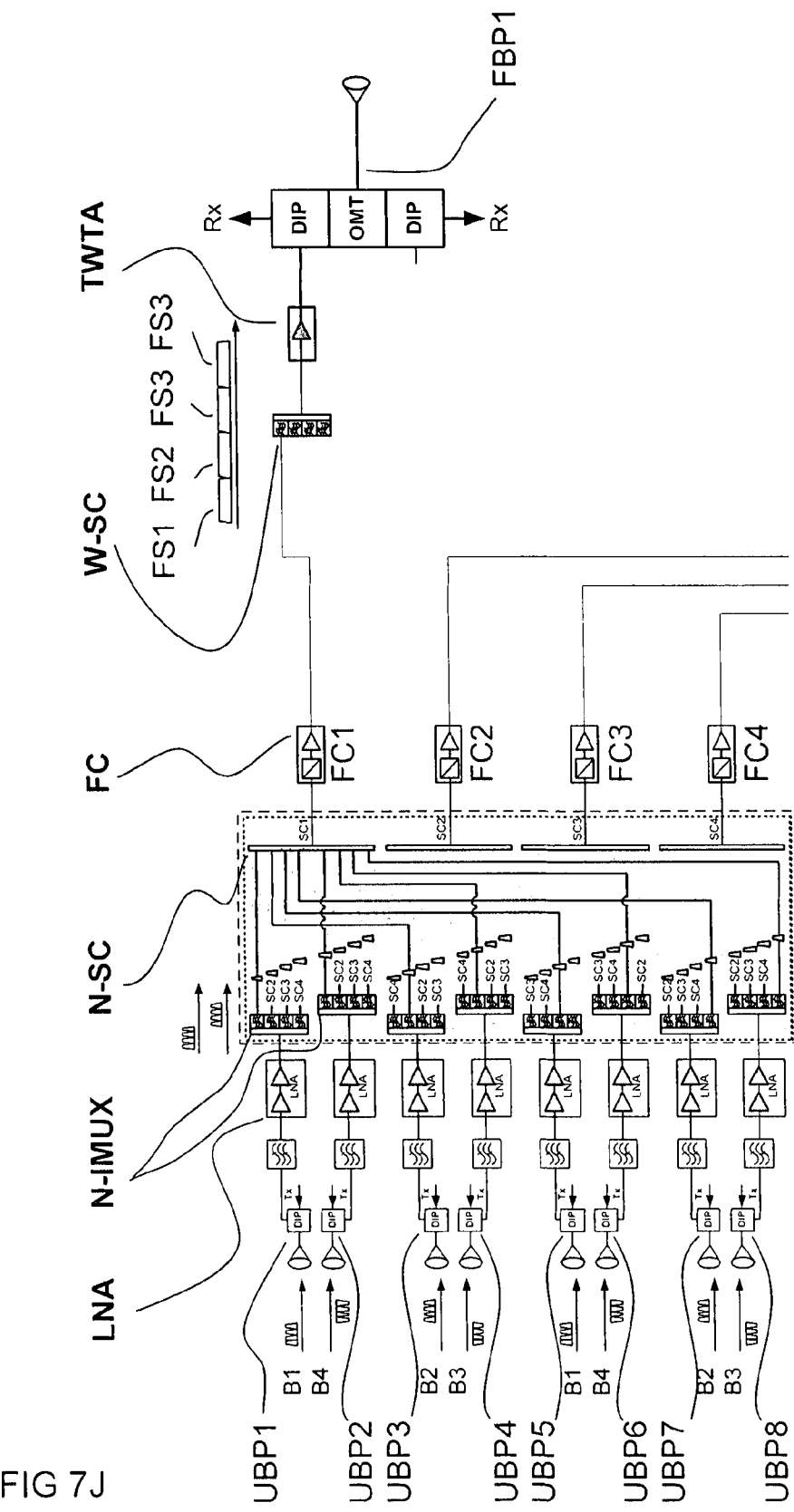
FIG. 7J illustrates details of FIG. 7D.

FIGS. 7C and 7D (together with FIGS. 7I and 7J) illustrate how the payload block diagram of FIGS. 7A and 7B, respectively, can be rearranged to minimise the interconnection lengths of the narrow-band input multiplexers and narrow-band signal combiners.

Indeed it can be observed that the number of interconnections between the set of wide-band input multiplexers W-IMUX and the frequency converters FC is lower than the number of interconnections between the set of narrow-band input multiplexers and the set of narrow-band signal combiners. For these reason, minimising the lengths of the interconnection between the narrow-band input multiplexers and the narrow-band signal combiners is preferable in terms of reduction of the overall interconnections and level of integration.

The interconnection topology of a set of narrow-band input multiplexers and narrow-band signal combiners for the forward link section and for the return link section are shown in FIGS. 7E and 7F, respectively.

Figure 8A:
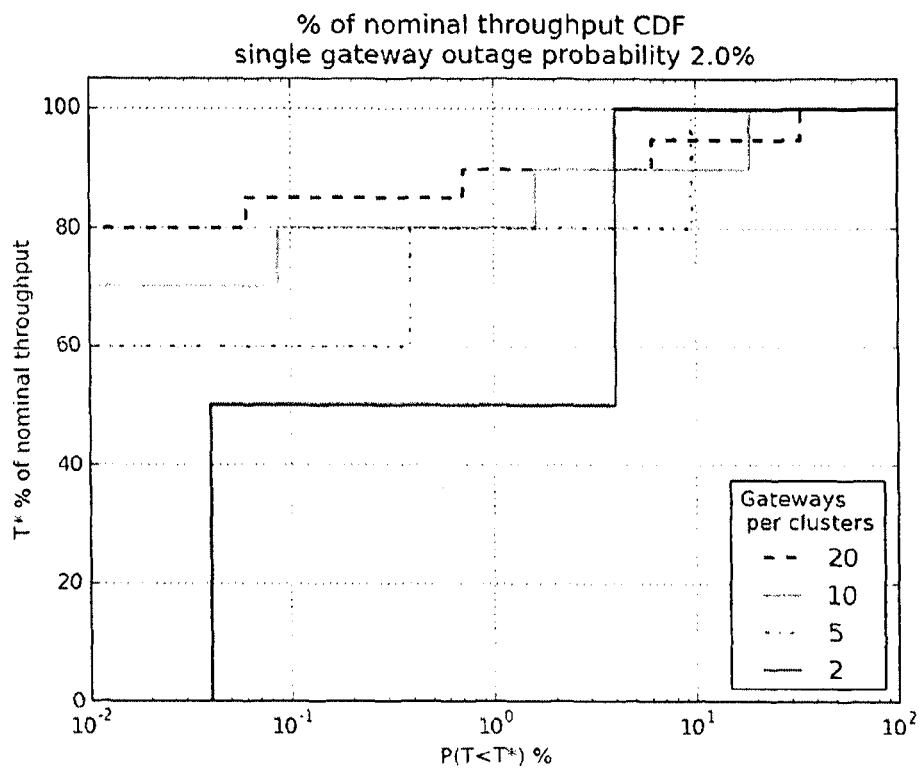
FIGS. 8A-8D illustrate the expected performances of a system and method according to said first embodiment of the invention.

FIG. 8A illustrates the result of a simplified performance analysis of a satellite network according to the first embodiment of the invention, described above. Different curves refer to networks comprising 2, 5, 10 and 20 gateways (or gateways per cluster). Gateways are supposed to have an uncorrelated outage probability of 2% (i.e. an availability of 98%). The curves on FIG. 8A illustrate the cumulative distribution function of the throughput T; P(T<T*) expresses the probability that the measured throughput is lower than a certain percentage T* of the nominal output, corresponding to the situation where there is no outage. It can be seen that, with a single gateway availability of 98%, a feeder link availability of 99.9% can be achieved with a throughput reduction of 50% for 2 gateways sharing the same beam or 40% for 5 gateways sharing the beam. Reducing the target feeder link availability to 99.6% the capacity reduction with 5 gateways sharing the beam is reduced to a more acceptable value of 20%. In case the target availability is higher i.e. 99.99% then for 5 gateways sharing the beam the capacity loss will be 40%.

Figure 8B:
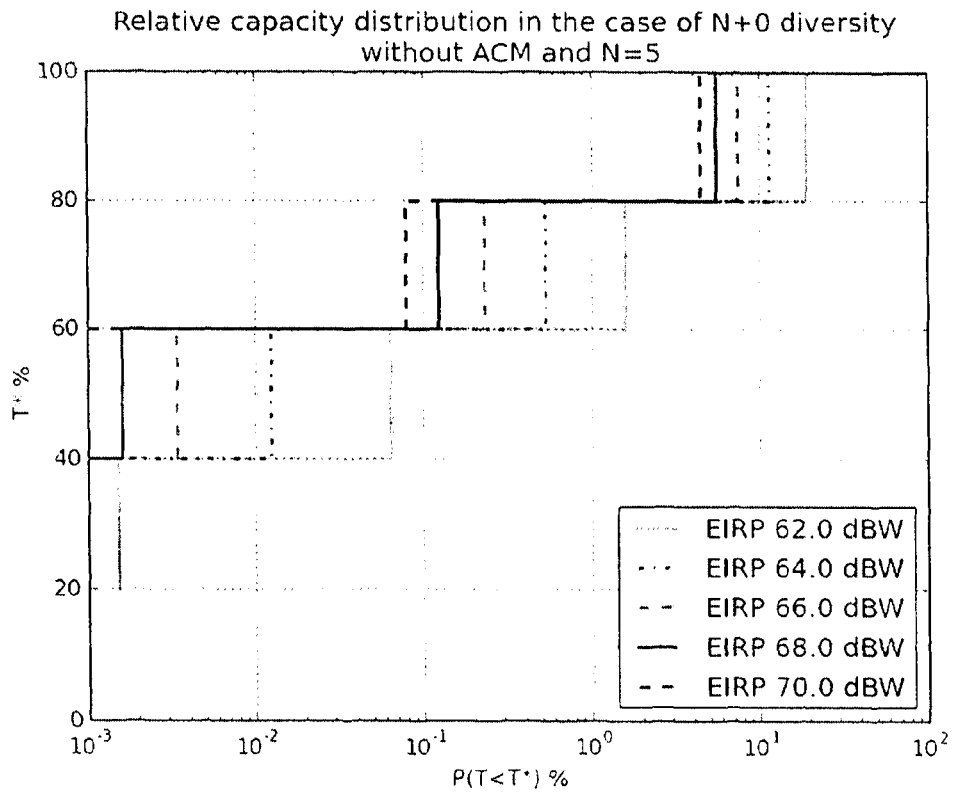

FIG. 8B refers to a more realistic scenario which takes into account key system parameters as well gateways location and the corresponding ITU fading CDF distribution.

In particular, the system is assumed to occupy the maximum bandwidth available at Ka and Q/V band. For the forward uplink the use of a 4.5 GHz bandwidth comprised between 47.5 and 52 GHz is assumed. For the forward downlink the use of 250 beams at the frequency band between 17.3 and 20.2 GHz on two orthogonal polarizations is considered.

It is assumed that the clear-sky waveform is a 8PSK ⅗ with a spectral efficiency of 1.77. Therefore the maximum achievable throughput considering the 250 beams and 1400 MHz of bandwidth allocated per beam is 620 Gbps (Gigabit per second). The number of dedicated gateways considering 9 GHz (on two polarizations for the gateways is at least of 39). The constraints linked to this large number of gateways are supposed to be balanced by the low dimensions in terms of power and antenna diameter of the earth stations. The detailed parameters for the satellite payload and for the gateway sizing are given in the following table 1. The gateways are placed all over Europe and the minimum distance among two gateways is 400 km.

TABLE 1

System parameters-1

| Uplink Parameters | | |
|---|---|---|
| G/T sat | 29.3 | dB/K |
| C/I co-channel | 17 | dB |
| Downlink Parameters | | |
| Satellite EIRP EoC | 68.8 | dB |
| OBO | 2.5 | dB |
| C/I co-channel | 17 | dB |
| Intermodulation Degradation | 0.8 | dB |

It can be seen that, in this more realistic analysis, a 99.9% feeder link availability with 5 gateways sharing the same beam provides a throughput reduction of 20% for a gateway EIRP greater than 67 dBW. In case the target availability is higher i.e. 99.99%, then for 5 gateways sharing the beam the capacity loss will be 40% for a gateway EIRP greater than 63 dBW.

Figure 8C:
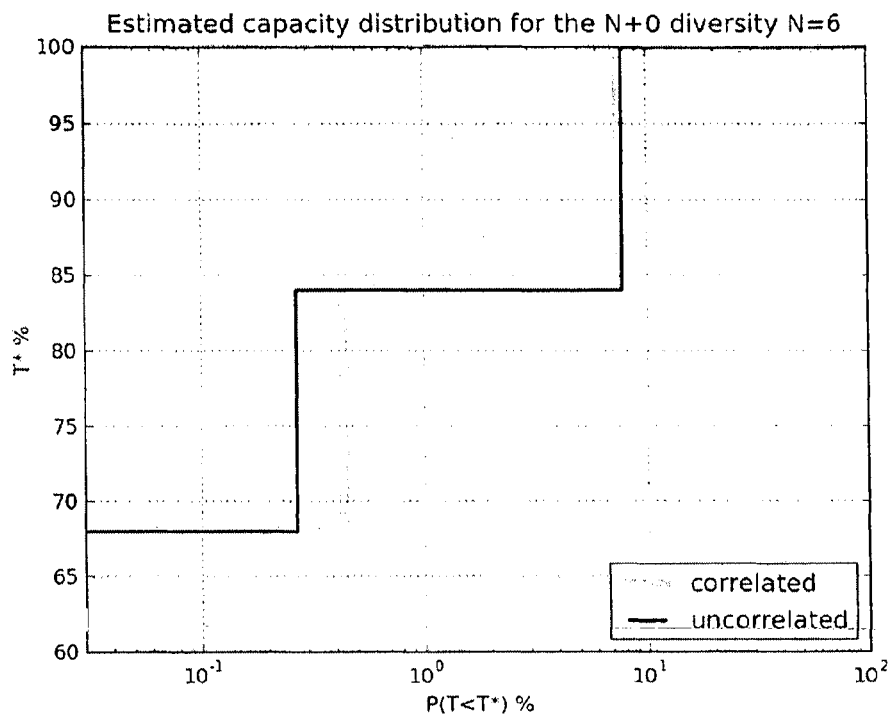

FIG. 8C illustrates the impact of the fading spatial correlations on the cumulative distribution function of the throughput of a network with $N_{GW}=6$ gateways (or $N_{GW}=6$ gateways/cluster).

In this case, For the forward uplink, the use the use of a 4 GHz bandwidth between 48 and 52 GHz is assumed. The use of dual polarization is considered. For the forward downlink 2.5 GHz at Ka band between 27.5 and 30 GHz are foreseen. It is assumed that a 32APSK ¾ modcod (modulation and coding) can close the link budget at least without any propagation impairment in the atmosphere. The spectral efficiency of such a modulation is 3.7 b/s/Hz.

The detailed parameters for the satellite payload and for the gateway sizing are given in the following table 2.

TABLE 2

System parameters-2

| Uplink Parameters | | |
|---|---|---|
| GES EIRP | 76.5 | dBW |
| G/T sat | 31.5 | dB/K |
| C/I co-channel | 30 | dB |
| Downlink Parameters | | |
| Satellite EIRP EoC | 72.5 | dB |
| OBO | 2.5 | dB |
| C/I co-channel | 21 | dB |
| C/Im | 25 | dB |

Figure 8D:
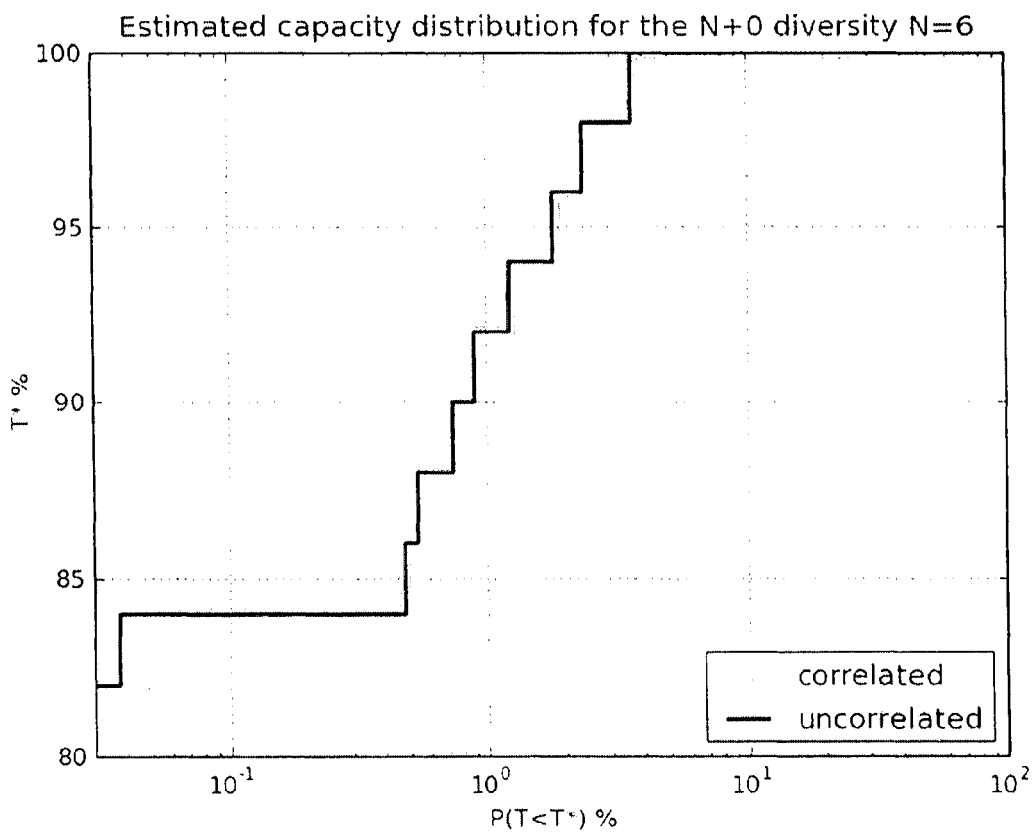

As discussed above, ACM is expected to provide some performance advantage when used as last resort to also combat the feeder link fading effects. To demonstrate this intuition some results are provided under the assumption that the impact on the user link fading is negligible. FIG. 8D refers to the same test configuration of FIG. 8C, wherein ACM has been introduced. Compared to the case without ACM, the throughput reduction is smaller. Concerning the fading correlation impact the capacity estimated it is remarked that using correlated time series it is slightly lower than the in the uncorrelated case. In fact the difference in the capacity distribution estimated with spatially correlated or uncorrelated attenuation sample is rather low for two reasons:

The attenuation correlation among the different gateways is low as their spacing is large;

The "macro-diversity" technique (i.e. gateway diversity, with gateways sufficiently distant from each other to lie within different feeder beam footpaths) proposed in the first embodiment does not change the average capacity but only its standard deviation, thus limiting the potential impact on the shape of the distribution.

Figure 9A:
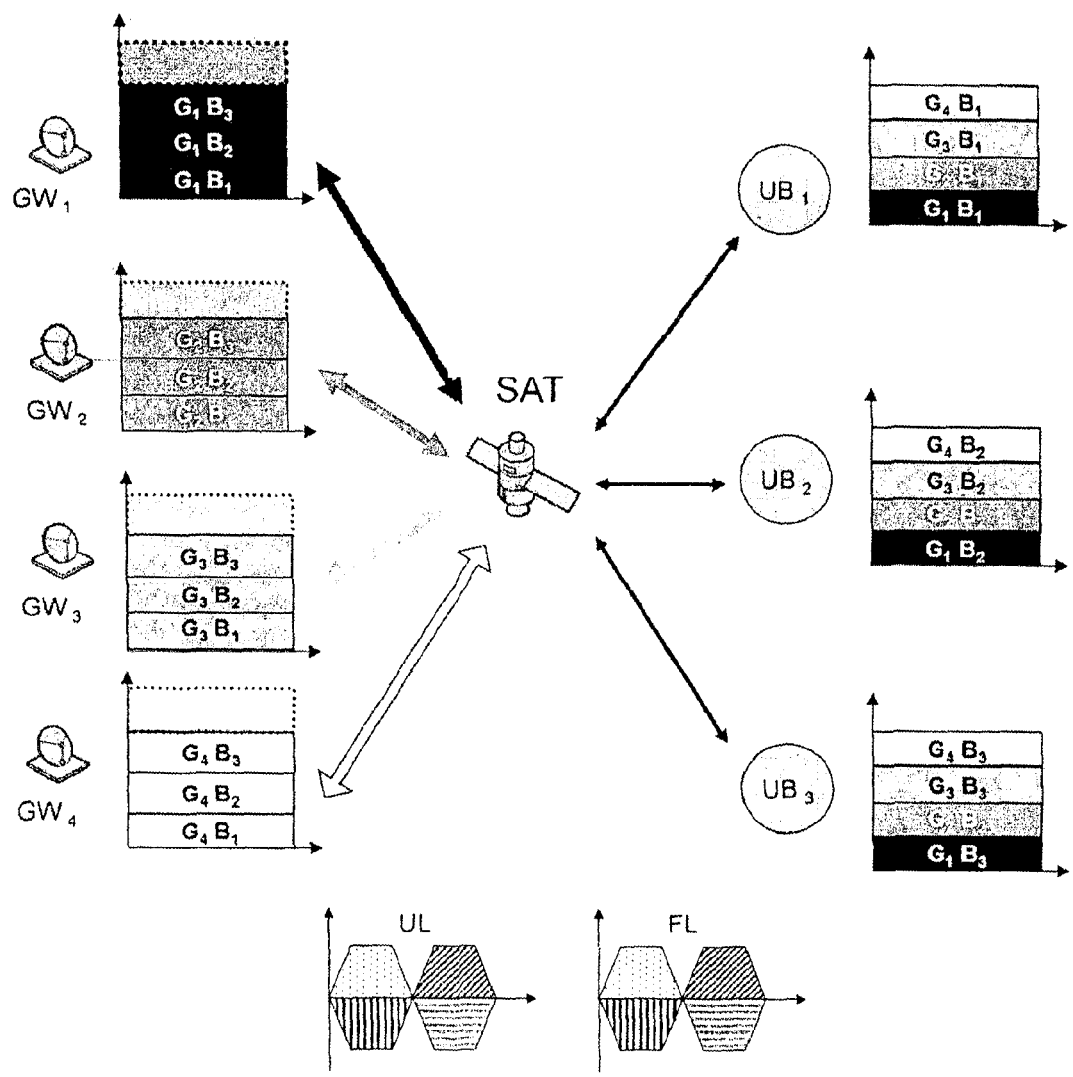
FIGS. 9A and 9B illustrate the operation of a system and method according to a second embodiment of the invention, in normal conditions and with a gateway station experiencing atmospheric fading, respectively.
Figure 9B:
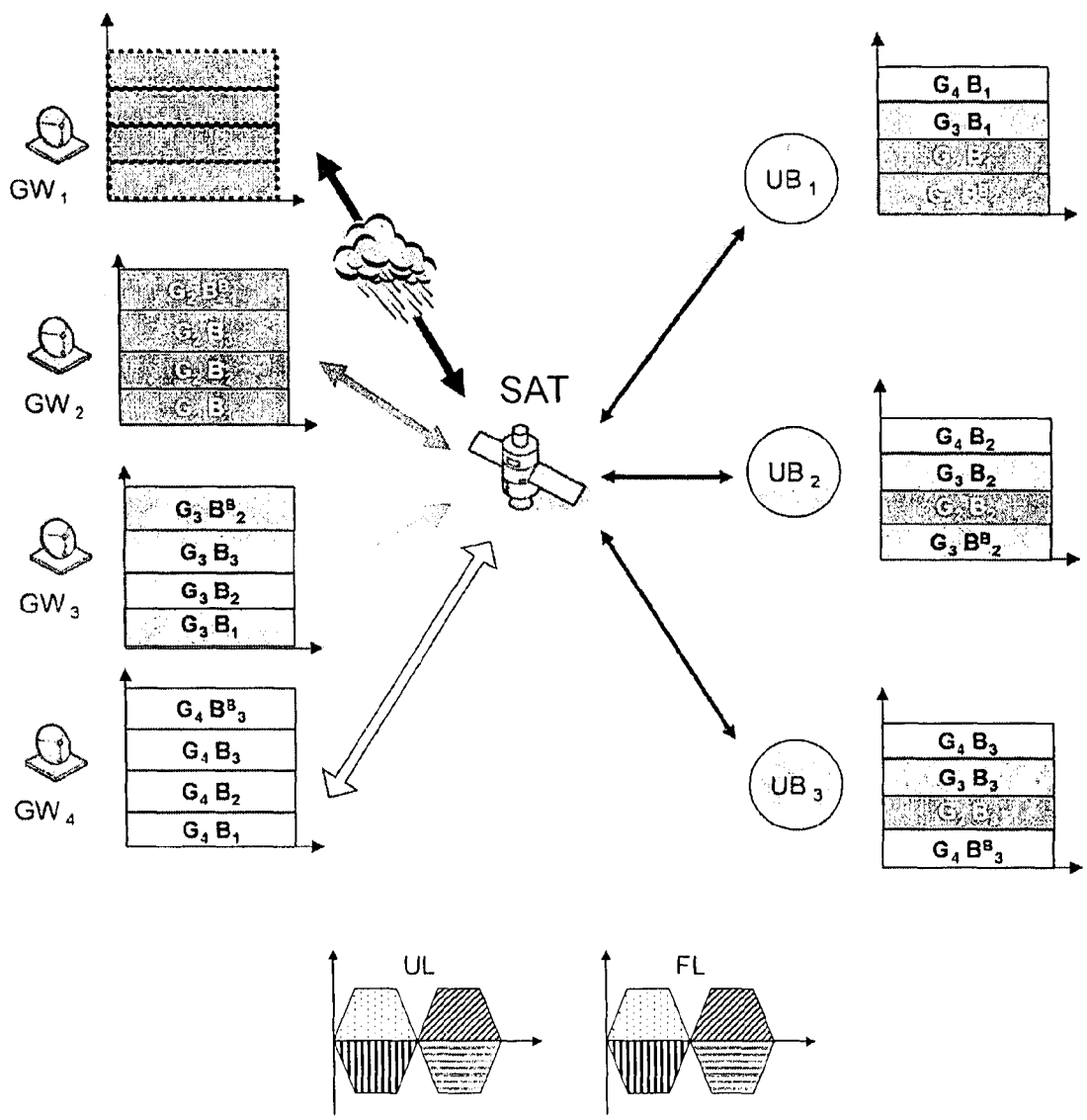

The second embodiment of the invention, which is illustrated by FIGS. 9A and 9B, is quite similar to the already-described first embodiment, but The number of gateway stations is higher than the required number $N_{GW}^{Req}$ determined by equation 2—i.e. there is redundancy: $N_{GW}=N_{GW}^{Req}+P$, with P≥1;

In normal conditions, every gateway uses only part of the available carriers, the remaining, unused carrier being reserved; and When a feeder link undergoes a significant fading, the other-gateways-use-their-additional resources (reserved-carriers) to serve a subset of the beams nominally allocated to the faded gateway.

In the example of FIGS. 9A and 9B, $N_{GW}^{Req}=3$ and $N_{GW}=4$, i.e. there is a redundant gateway (P=1). Each gateway can transmit over 4 carriers, but in normal conditions (FIG. 9A), only three of them are used. The number of user beams is K=3, and $N_{carriers/Beam}=4$.

FIG. 9B refers to the situation where gateway $GW_1$ is in outage due e.g. to heavy rain. Its data traffic is routed to the other gateways $GW_2$-$GW_4$, which activate their reserved carriers to increase their throughput. More particularly, data which were previously transmitted over the $G_1B_1$ carrier are now transmitted over (previously unused) carrier $G_3B_1^B$; data which were previously transmitted over the $G_1B_2$ carrier are now transmitted over (previously unused) carrier $G_2B_2^B$; data which were previously transmitted over the $G_1B_3$ carrier are now transmitted over (previously unused) carrier $G_4B_1^B$.

FIG. 9B refers to the case where $GW_1$ is experiencing complete outage. However, in some cases, $GW_1$ (or any other gateway) will only experience a reduction of its capacity, due e.g. to moderate rain. In this case the use of less carriers for $GW_1$ or ACM exploitation will allow carrying part of the traffic on $GW_1$, so that only part of the extra carriers will be activated in the other gateway.

The second embodiment is advantageous over the first embodiment because fading does not introduce a reduction of the throughput, as long as the number of faded feeder links does not exceed the number P of redundant gateways. Moreover, reducing the number of active carriers per gateway reduces intermodulation and the HPA OBO (Output Back Off). Of course, these advantages are obtained at the expense of an increased infrastructure cost (P additional gateways) and of a slightly more complex satellite payload.

ACM can be used as in the first embodiment, but in a slightly different way. Indeed, the first reaction to feeder link fading will trigger the ACM, but when the feeder link fading exceeds the $ACM_{range}^{FL}$ [dB] value (typically a small fraction of the physical later ACM range) the gateway handoff process will be started. This approach will exploit only a limited dynamic ACM range to counteract feeder link fading. In other words, the system will allow only a certain maximum faded feeder link capacity degradation, which will be chosen by the system designer as a function of overall system performance optimization (throughput, availability etc.). Only when all the redundant resources available are in fading at the same time, ACM will be re-activated again.

Figure 10A:
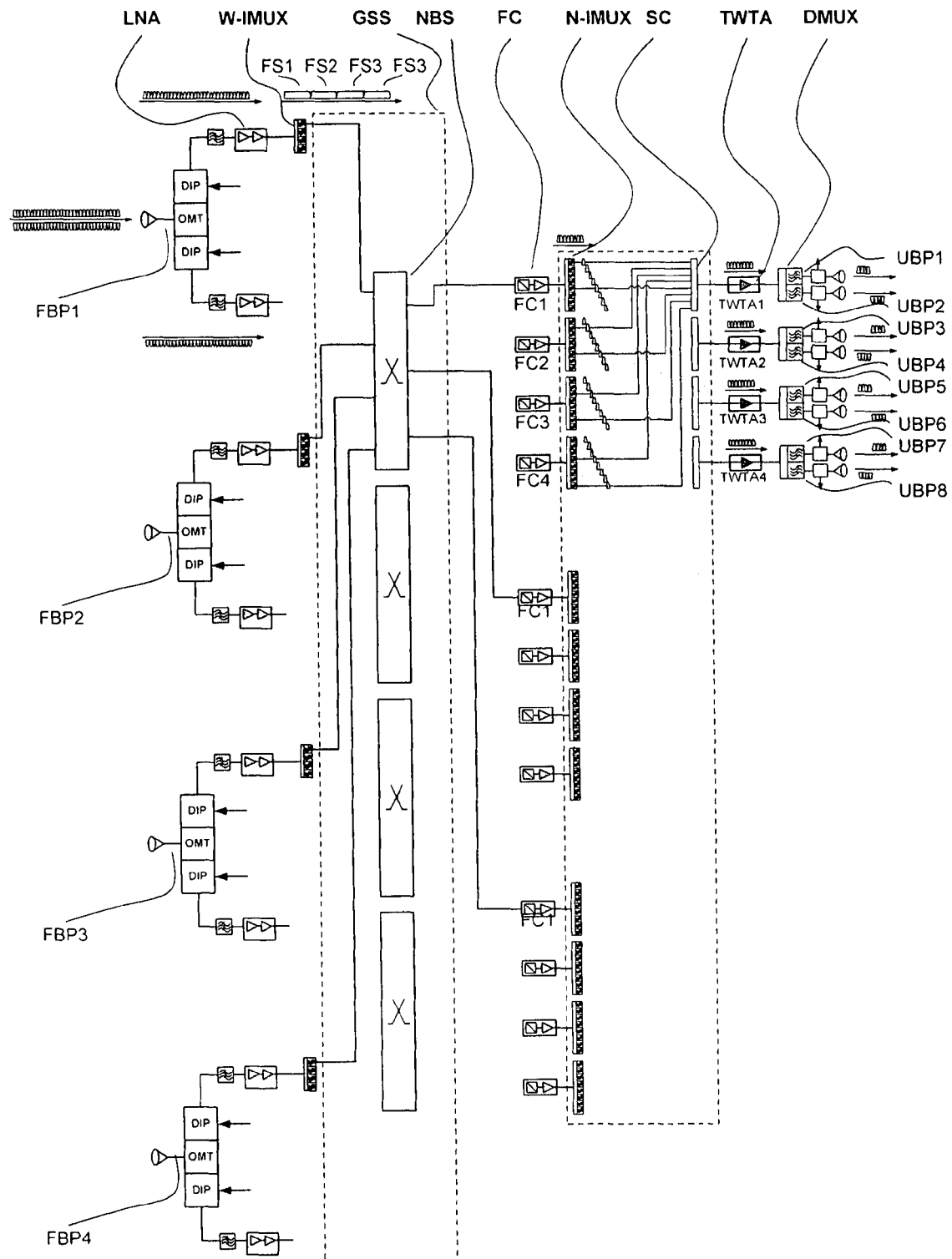
FIG. 10A is a simplified scheme of the forward link section of a satellite payload implementing the space segment of the system of FIGS. 9A and 9B.
Figure 10B:
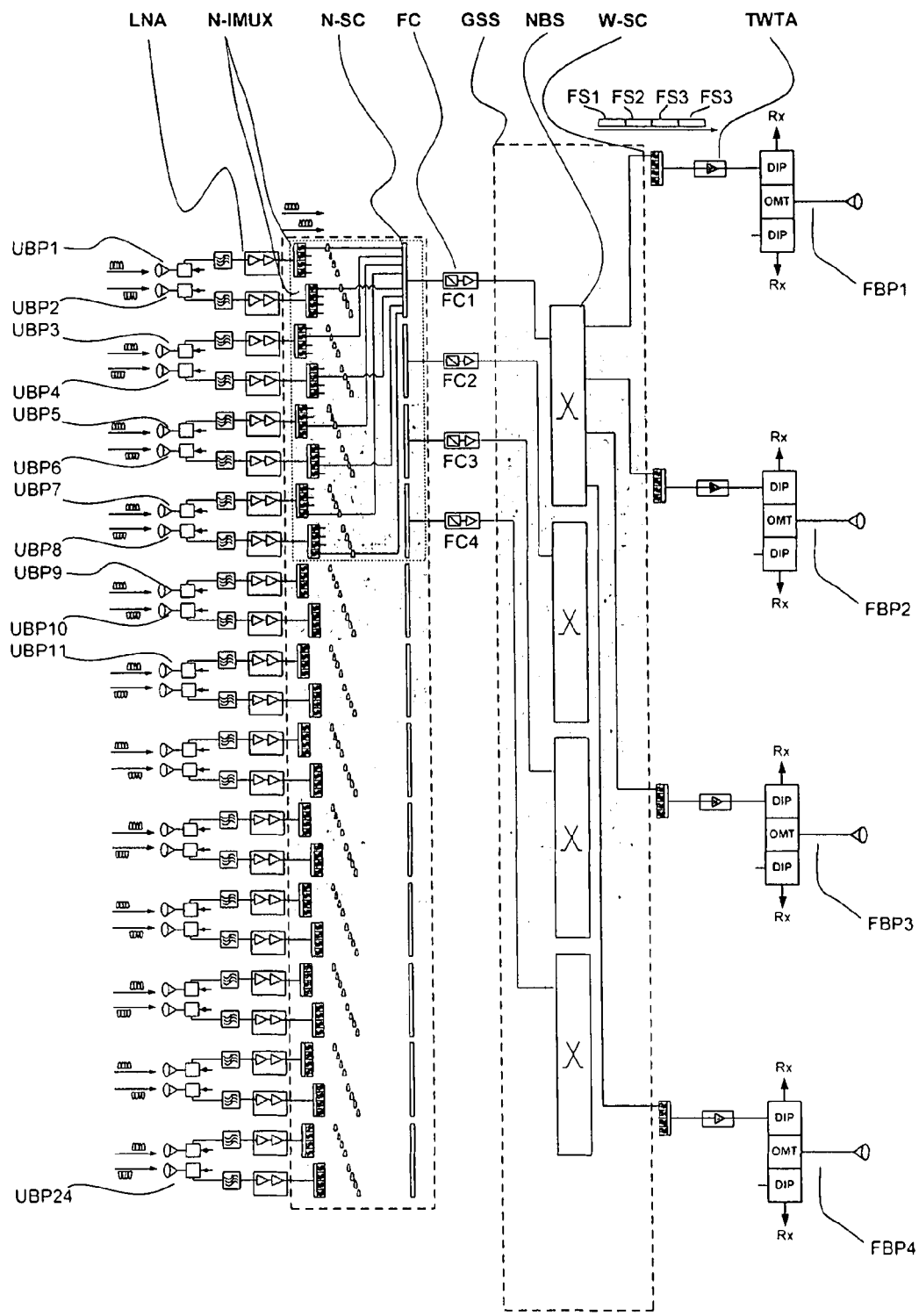
FIG. 10B is a simplified scheme of the return link section of a satellite payload implementing the space segment of the system of FIGS. 9A and 9B.
Figure 10C:
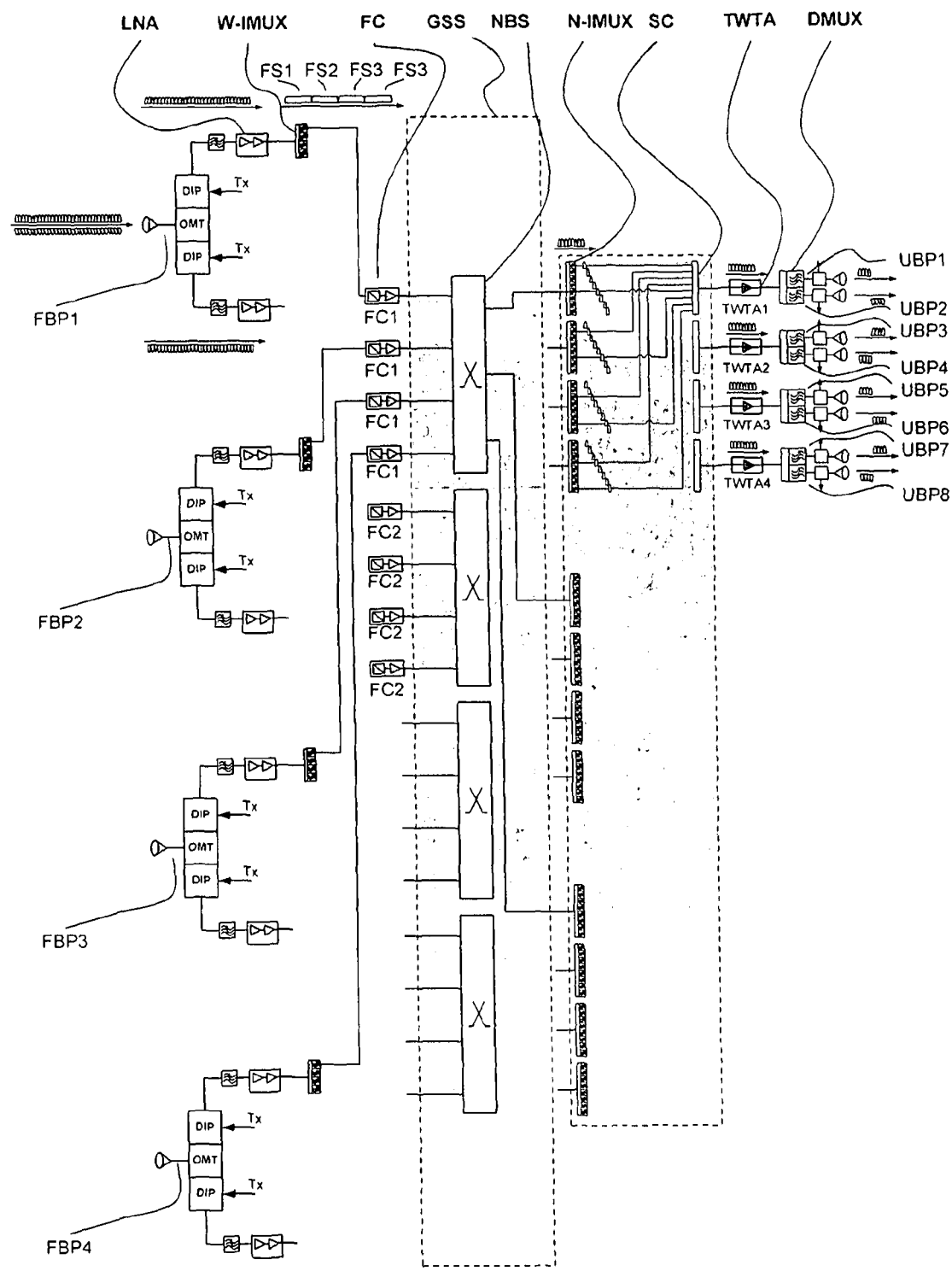
FIG. 10C is a simplified scheme of the forward link section of a satellite payload implementing the space segment of the system of FIGS. 9A and 9B with the switching matrix operating at the user link frequency.
Figure 10D:
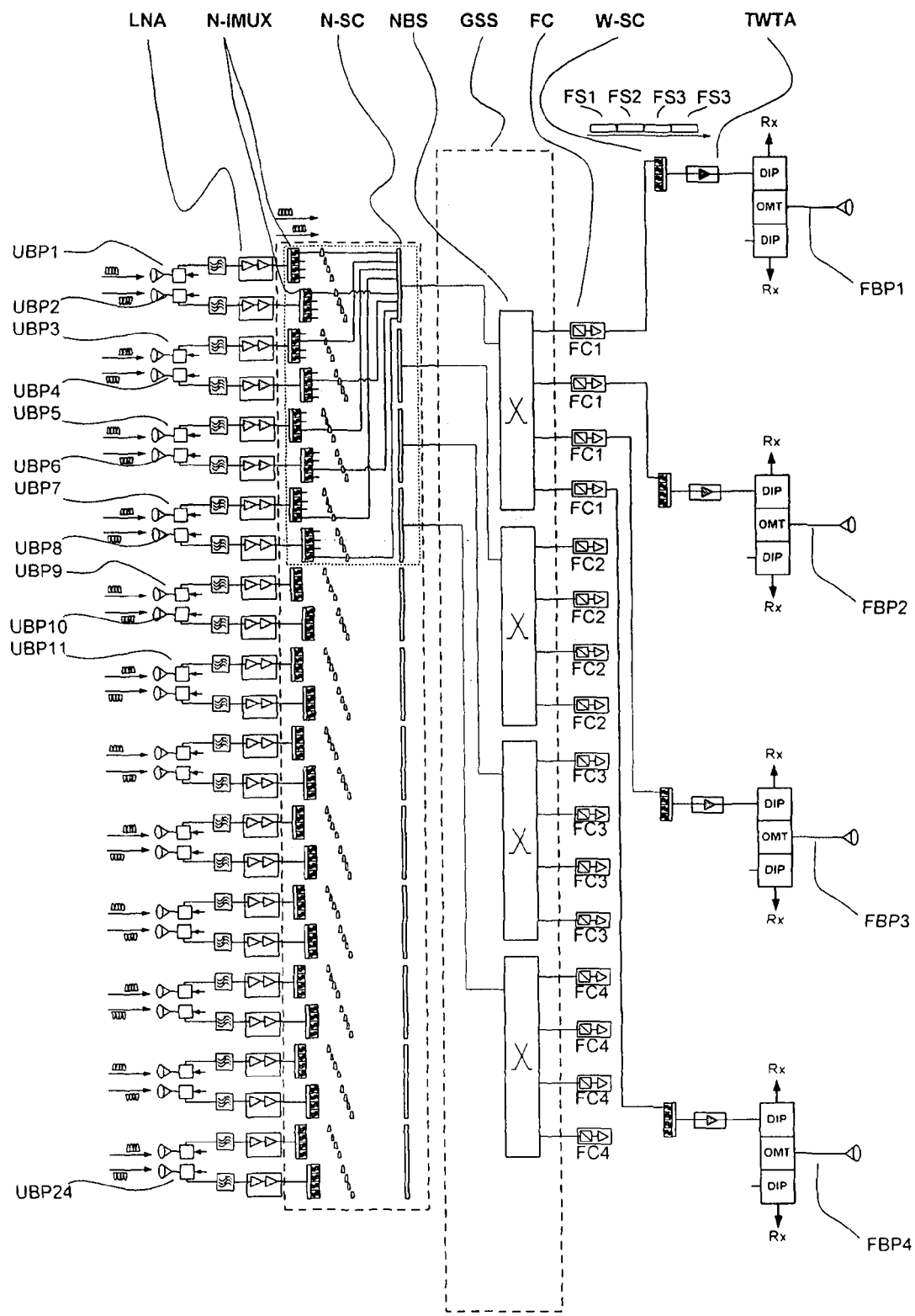
FIG. 10D is a simplified scheme of the return link section of a satellite payload implementing the space segment of the system of FIGS. 9A and 9B with the switching matrix operating at the user link frequency.
Figure 10E:
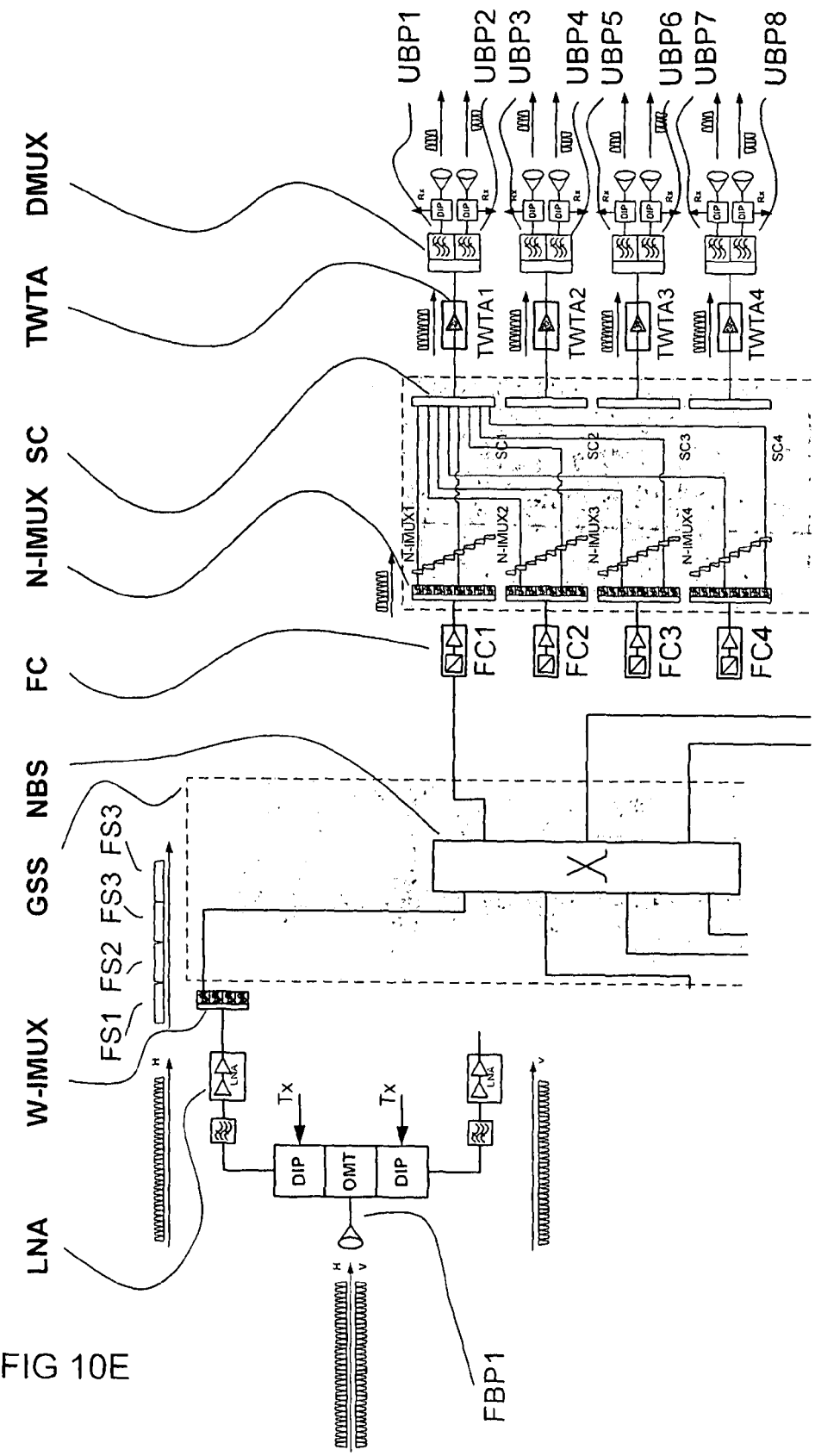
FIG. 10E illustrates details of FIG. 10A.

FIGS. 10A and 10E (magnified detail) illustrate the structure and operation of the forward link section of a satellite payload for implementing the second embodiment of the invention. It can be seen that said section is similar to the one illustrated on FIG. 7C (first embodiment), except in that:

There are 2($N_{GW}$+P) feeder beam ports, low-noise amplifiers and wide-band input multiplexers (W-IMUX), and only 2 $N_{GW}$ narrow-band input multiplexers (N-IMIX) and narrow-band signal combiners (N-SC) (the factor 2 comes from the use of dual polarization); and A Gateway Selectivity Switch GSS, formed by $$M_C \frac{B^{FL} N_P^{FL}}{N_C^{FL}} \frac{1}{B^{UL}} = 4 \cdot M_c = 4 -$$

here $M_C$ is supposed to be equal to 1–($N_{GW}$+P):$N_{GW}$ non blocking switches NBS, is provided between the wide-band input multiplexers (W-IMUX) and the frequency converters (FC) in order to select frequency slices from $N_{GW}$ out of ($N_{GW}$+P) different gateways.

Figure 10F:
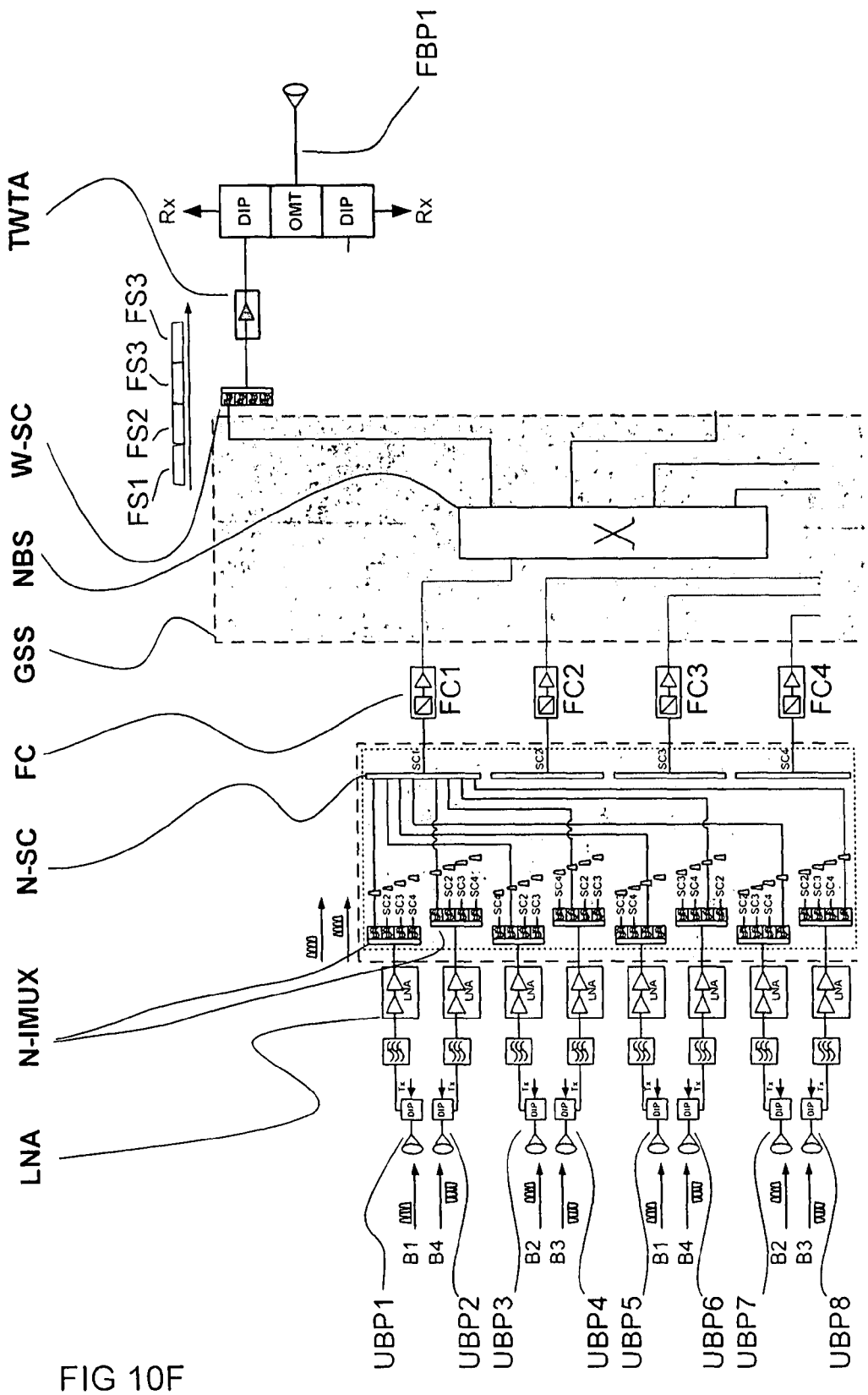
FIG. 10F illustrates details of FIG. 10B.

The structure of the return link section of the satellite payload, illustrated on FIGS. 10B and 10F (magnified detail), is reciprocal to that of the forward link section: input and output are exchanged, and so are low-noise amplifiers and power amplifiers; filter banks are replaced by signal combiner, and vice-versa.

According to these implementations of the forward and return link payloads, the number of frequency converters (FC) is minimised but the Gateway Selectivity Switch (GSS) must operate at the feeder link frequency (e.g. Q/V-band).

Figure 10G:
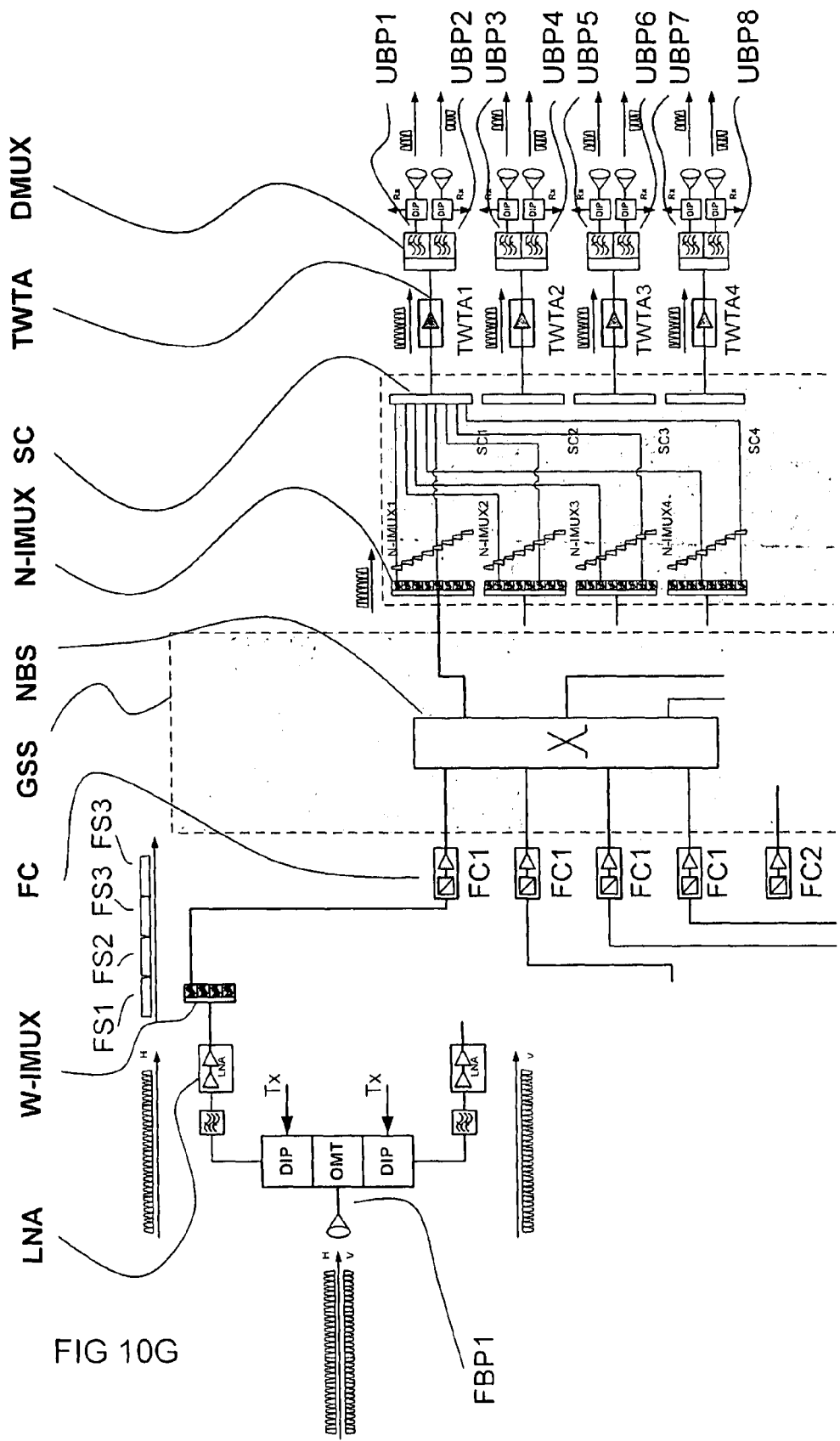
FIG. 10G illustrates details of FIG. 10C.
Figure 10H:
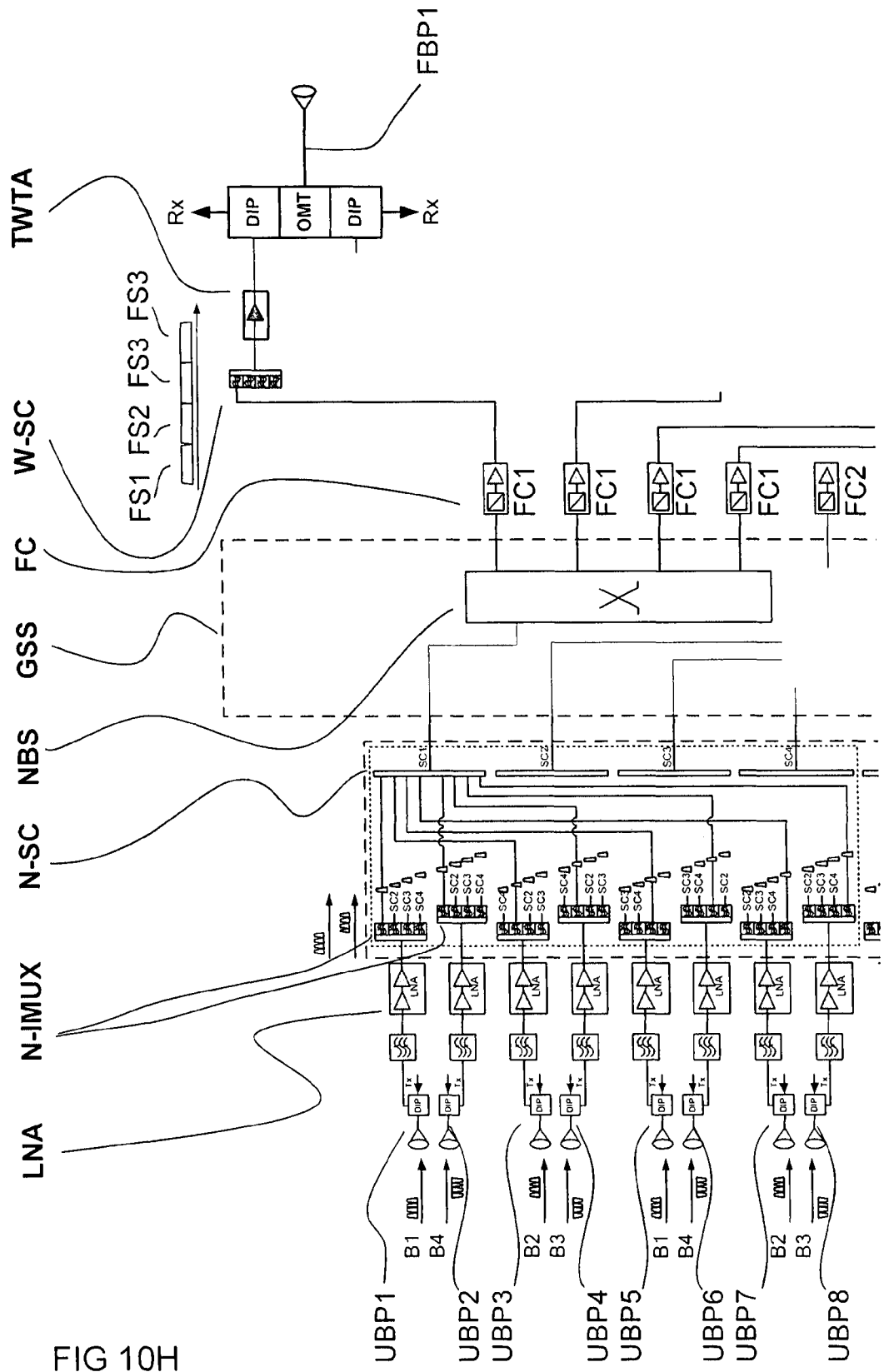
FIG. 10H illustrates details of FIG. 10D.

In alternative implementations of the inventive payload of the second embodiment, the order of the frequency converters (FC) and Gateway Selectivity Switch (GSS) can be exchanged such to have the switches operating at the user link frequency (e.g. Ka-band). This alternative implementation is shown in FIGS. 10C and 10D (together with FIGS. 10G and 10H) for the forward link section and for the return link section, respectively.

In a further alternative implementation, additional frequency conversion stages can be introduced to allow the implementation of filtering and switching at a more suitable (usually lower) frequency, and/or digitally by means of a digital on-board processor.

It is to be remarked that, for this second embodiment, the user terminal frequency agility exploitation is not a essential, but allows improving the system performance In fact, if non-frequency agile terminals are used, then the link availability can be ensured only as long as in case of gateway unavailability, another gateway can take over the carriers previously served by the nominal gateway.

LIST OF SYMBOLS $B_B^{UL}$ User Beam bandwidth
$B^{UL}$ User Link bandwidth
$B^{FL}$ Feeder Link bandwidth
$B_{Tot}^{FL}$ Total system band in the Feeder Link
$B_{GW}^{FL}$ Feeder Link Band per Gateway
F Number of Faded Gateways
$GW_{m,n}(k)$ Carrier transmitted by the $n^{th}$ of the $m^{th}$ cluster serving the $k^{th}$ beam
K Number of User beams, or of User beams per Cluster
$K_C$ Number of User beams per Gateway Cluster
I frequency slot #I
M Gateway Cluster Size
$M_C$ Number of Gateway Clusters
MG[dB] link margin
$N_C^{UL}$ Number of colours in the User Link
$N_C^{FL}$ Number of colours in the Feeder Link
$N_B^{UL}$ Number of User Beams
$N_{Carriers/beam}$ Number of Carriers per User Beam
$N_P^{UL}$ Number of Polarizations in the User Link
$N_P^{FL}$ Number of Polarizations in the Feeder Link
$N_{GW}^{Req}$ Number of required Gateways
N Number of Required Gateways (same as $N_{GW}^{Req}$)
$N_{GW}$ Actual number of Gateways, or of Gateways per Cluster
$N_{GW}^{Tot}$ Total Number of Gateways
P Number of redundant Gateways
$P_b^{Rx}$ Received Power of the Beacon
$[P_b^{Rx}]_{nom}$ Nominal Received Power of the Beacon
$S_{fad}^{Max}$ fading slope [dB/s]
$T_{HO}$ gateway Hand-Off Time [s]
$T_i$ i-th threshold
$\Delta P_{ULPC}$ Up Link Power Control (ULPC) range

REFERENCES

[1] Bosisio A, Capsoni C, Paraboni A, Corazza G E, Vatalaro F, Vassallo E. "Analysis and applications of short-distance site diversity techniques for 20/30 GHz-communication links", Proceedings of the Globecom '95, IEEE 1995 Global Telecommunications Conference, Singapore, 1995.
[2] M. Luglio, R. Mancini, C. Riva, A. Paraboni and F. Barbaliscia, "Large-scale site diversity for satellite communication networks", Int. J. Satell. Commun. 2002; No. 20, pp.: 251-260.
[3] U.S. Pat. No. 7,584,297
[4] U.S. Pat. No. 7,599,657

The invention claimed is:

1. A satellite communication system comprising:
   a multibeam satellite for generating a plurality of feeder beams and a plurality of user beams over a region of interest;
   a plurality of spatially-separated gateway stations for providing feeder links to said multibeam satellite via respective feeder beams;
   a communication network interconnecting said spatially-separated gateway stations; and
   means for detecting at least one degraded feeder link;
   wherein the satellite communication system further comprises control means for operating said gateway stations and said multibeam satellite such that:
   in nominal conditions, a set of $N_{GW}$ gateway stations exchanges data with user terminals situated within footprints of K>1 user beams, each of said gateway stations allocating a fraction of bandwidth of the gateway stations to each of said user beams, and each of said user terminals exchanging data with a single gateway station of the set; and
   in an event of degradation of one or more feeder links, data are switched from the gateway stations associated to degraded feeder links to gateway stations associated to non-degraded feeder links using said communication network, whereby none of said user terminals experiences service outage.

2. A satellite communication system according to claim 1, wherein each gateway station of said set is configured to transmit and/or receive data using K carriers, a subset of which being allocated to a respective user beam, and conversely each of said user beam comprises a multiple of $N_{GW}$ carriers, each being associated to a respective gateway station.

3. A satellite communication system according to claim 2, wherein different carriers are associated to user beams having adjacent footprints, while the same carriers are associated to different feeder beams.

4. A satellite communication system according to claim 1, wherein each gateway station is configured to react to a degradation of the corresponding feeder link by activating Adaptive Coding and Modulation to counteract fading impairments by reducing its throughput.

5. A satellite communication system according to claim 1, comprising a plurality of disjoint sets of gateway stations and a plurality of disjoint sets of user beams, wherein gateway stations belonging to a same set of gateway stations exchange data with, and only with, users terminals situated within the footprints of user beams belonging to a same set of user beams.

6. A satellite communication system according to claim 1, wherein an operational bandwidth is associated to each of said gateway station and wherein each of said gateway stations is configured for using its whole operational bandwidth for exchanging data with user terminals, whereby degradation of one or more feeder links causes a throughput reduction for all the user beams associated to said feeder link or links.

7. A satellite communication system according to claim 1, wherein an operational bandwidth is associated to each of said gateway station and wherein each of said gateway stations is configured for:
- in nominal conditions, using only a part of its operational bandwidth for exchanging data with user terminals, leaving a remaining part unused; and
- in the event of degradation of a feeder link associated to a different gateway station, using all or a fraction of said unused part of its operational bandwidth for exchanging data with user terminals which, in nominal conditions, exchange data through the degraded feeder link.

8. A method of performing satellite communication comprising:
- operating a multibeam satellite generating a plurality of feeder beams and a plurality of user beams over a region of interest (ROI);
- operating a plurality of spatially-separated gateway stations for providing feeder links to said multibeam satellite via respective feeder beams; and
- monitoring degradation of said feeder links;

wherein the method further comprises:
- in nominal conditions, operating a set of $N_{GW}$ gateway stations for exchanging data with user terminals situated within footprints of K>1 user beams, each of said gateway stations allocating a fraction of bandwidth of the gateway stations to each of said user beams, and each of said user terminals exchanging data with a single gateway station of the set; and
- in an event of degradation of one or more feeder links, switching data from gateway stations associated to degraded feeder links to the gateway stations associated to non-degraded feeder links using a communication network, whereby none of said user terminals experiences service outage.

9. A method of performing satellite communication according to claim 8, wherein each gateway station of said set transmits and/or receives data using K carriers, a subset of which being allocated to a respective user beam, and conversely each of said user beams comprises a multiple of NGW carriers, each being associated to a respective gateway station.

10. A method of performing satellite communication according to claim 9, wherein different carriers are associated to user beams having adjacent footprints, while the same carriers are associated to different feeder beams.

11. A method of performing satellite communication according to claim 8, wherein each gateway station reacts to a degradation of the corresponding feeder link by activating Adaptive Coding and Modulation to counteract fading impairments by reducing its throughput.

12. A method of performing satellite communication according to claim 8 wherein said gateway stations and said user beams are partitioned in a plurality of disjoint sets, and wherein gateway stations belonging to a same set of gateway stations exchange data with, and only with, users terminals situated within the footprints of user beams belonging to a same set of user beams.

13. A method of performing satellite communication according to claim 8, wherein an operational bandwidth is associated to each of said gateway station and wherein each of said gateway stations uses its whole operational bandwidth for exchanging data with user terminals, whereby degradation of one or more feeder links causes a throughput reduction for all the user beams associated to said feeder link or links.

14. A method of performing satellite communication according to claim 8, wherein an operational bandwidth is associated to each of said gateway station and wherein:
- in nominal conditions, each gateway station uses only a part of its operational bandwidth for exchanging data with user terminals, leaving a remaining part unused; and
- in the event of degradation of a feeder link associated to a different gateway station, each gateway station uses all or a fraction of said unused part of its operational bandwidth for exchanging data with user terminals which, in nominal conditions, exchange data through the degraded feeder link.

15. A multibeam communication satellite payload for carrying out a method according to claim 8, comprising:
- at least a set of feeder beam ports, for inputting and/or outputting respective feeder link signals;
- at least a set of user link ports for inputting and/or outputting respective user link signals; and
- at least a forward link section interconnecting said feeder beam ports with said user link ports;

characterized in that said forward link section comprises:
- a first set of filter banks for separating signals inputted from each feeder beam port into a plurality of frequency slices, each of bandwidth equivalent to an overall user link bandwidth;
- a set of frequency converters for translating and aligning said frequency slices in the spectral domain;
- a second set of filter banks for separating individual carriers contained within each said frequency slice; and
- a set of signal combiners for combining individual carriers coming from different feeder beam ports into respective user link signals and outputting them through respective user link ports.

16. A multibeam communication satellite payload according to claim 15, further comprising at least a return link section interconnecting said user link ports with said feeder beam ports, said return link comprising:
- a set of filter banks for separating signals inputted from each user link ports into individual carriers;

a first set of signal combiners for combining individual carriers coming from different user beams antennas into spectrally-aligned frequency slices of feeder link signals;

a set of frequency converters for spectrally translating and staggering said frequency slices;

a second set of signal combiners for combining spectrally-staggered frequency slices into feeder link signals to be outputted through said feeder beam ports.

17. A multibeam communication satellite payload according to claim 16 comprising at least a pair of forward link sections and a pair of return link sections, wherein:

each feeder beam port is connected to both forward link sections and to both return link sections via a respective orthomode transducer; and each user link port is connected to a single forward link section and a single return link section.

18. A multibeam communication satellite payload according to claim 16, wherein, in said or each said forward link section:

said first set of signal combiners comprises a number of signal combiners which is lower then the number of signal combiners of said second set of signal combiners; and each signal combiner of said first set of signal combiners is connected to at-least one wide-band signal combiner of said second set of signal combiner via a respective $N_{GW}$:($N_{GW}$+P) non blocking switch (NBS), ($N_{GW}$+P) being the number of feeder beam ports belonging to each set and P being a positive integer.

19. A multibeam communication satellite payload according to claim 15 comprising $M_C$>1 sets of feeder beam ports, $M_C$ sets of user link ports and $M_C$ forward link sections or pairs of forward link sections, wherein each forward link section or pair of forward link sections is only connected to feeder beam ports belonging to a same set and to user link ports belonging to a same set.

20. A multibeam communication satellite payload according to claim 19 comprising $M_C$>1 sets of feeder beam ports, $M_C$ sets of user link ports and $M_C$ return link sections or pairs of return link sections, wherein each return link section or pair of return link sections is only connected to feeder beam ports belonging to a same set and to user link ports belonging to a same set.

21. A multibeam communication satellite payload according to claim 15 wherein, in said or each said forward link section:

said first set of wide-band filter banks comprises a number of filters which is higher than the number of filter banks of said second set of filter banks; and each filter bank of said second set of filter banks is connected to a filter of a filter bank of said first set of filter banks via a respective ($N_{GW}$+P):$N_{GW}$ non blocking switch (NBS), ($N_{GW}$+P) being the number of feeder beam ports belonging to each set and P being a positive integer.

* * * * *